United States Patent
Adee et al.

(10) Patent No.: US 12,428,006 B2
(45) Date of Patent: Sep. 30, 2025

(54) METHOD OF CONTROLLING VEHICLE FUNCTIONS, VEHICLE PROCESSING SYSTEM, VEHICLE, AND MACHINE-READABLE INSTRUCTION CODE

(71) Applicant: TomTom International B.V., Amsterdam (NL)

(72) Inventors: Ahmad Adee, Amsterdam (NL); Vishwanath Nagnath Pai, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 111 days.

(21) Appl. No.: 18/335,689

(22) Filed: Jun. 15, 2023

(65) Prior Publication Data
US 2024/0326843 A1  Oct. 3, 2024

(30) Foreign Application Priority Data

Mar. 30, 2023  (EP) ..................... 23165276

(51) Int. Cl.
*B60W 50/035* (2012.01)
*B60W 50/06* (2006.01)
(Continued)

(52) U.S. Cl.
CPC .......... *B60W 50/035* (2013.01); *B60W 50/06* (2013.01); *B60W 50/14* (2013.01);
(Continued)

(58) Field of Classification Search
CPC .... B60W 50/035; B60W 50/06; B60W 50/14; B60W 60/0015; B60W 2420/403;
(Continued)

(56) References Cited

U.S. PATENT DOCUMENTS 8,712,691 B2 * 4/2014 Joh .................. B60W 40/072
  701/2
9,547,989 B2 * 1/2017 Fairfield .............. G05D 1/0088
(Continued)

FOREIGN PATENT DOCUMENTS

CN     104573646 A   *  4/2015
EP       3073224 B1  *  5/2019  .......... G01C 21/165
(Continued)

OTHER PUBLICATIONS

"Buchholz, M; et. al.; Handling Occlusions in Automated Driving Using a MEC Server-based Environment Model From Infrastructure Sensor; May 2021; IEEE Intelligent Transportation Systems Magazine" (Year: 2021).*

(Continued)

*Primary Examiner* — Ramya P Burgess
*Assistant Examiner* — Christopher R Cardimino
(74) *Attorney, Agent, or Firm* — Whitmyer IP Group LLC

(57) ABSTRACT

To control vehicle functions of a vehicle, at least one processing circuit performs a fusion of vehicle sensor data and map data. To ensure a Safety of the Intended Functionality, the at least one processing circuit performs a situation analysis to detect a situation that has a potential to impact safety of the vehicle. The at least one processing circuit adjusts at least one confidence value based at least on the situation analysis. The at least one confidence value determines a relative impact of the vehicle sensor data and the map data in performing the fusion. The at least one processing circuit causes at least one function to be performed that is determined based on the fusion.

20 Claims, 18 Drawing Sheets

(51) Int. Cl.
  *B60W 50/14* (2020.01)
  *B60W 60/00* (2020.01)
(52) U.S. Cl.
  CPC ... *B60W 60/0015* (2020.02); *B60W 2420/403* (2013.01); *B60W 2420/408* (2024.01); *B60W 2554/40* (2020.02); *B60W 2555/20* (2020.02); *B60W 2556/35* (2020.02); *B60W 2556/40* (2020.02); *B60W 2556/45* (2020.02); *B60W 2710/06* (2013.01); *B60W 2710/18* (2013.01); *B60W 2710/20* (2013.01)
(58) Field of Classification Search
  CPC ....... B60W 2420/408; B60W 2554/40; B60W 2555/20; B60W 2556/35; B60W 2556/40; B60W 2556/45; B60W 2710/06; B60W 2710/18; B60W 2710/20
  See application file for complete search history.

(56) References Cited

U.S. PATENT DOCUMENTS

| | | | |
|---|---|---|---|
| 11,987,250 B2* | 5/2024 | Yu | G01S 7/003 |
| 2019/0084549 A1* | 3/2019 | Dagan | G07C 5/0808 |
| 2019/0291742 A1 | 9/2019 | Leach et al. | |
| 2020/0331495 A1* | 10/2020 | Bracquemond | B60W 60/0016 |
| 2021/0258471 A1* | 8/2021 | Stanard | H04N 23/61 |
| 2022/0144304 A1 | 5/2022 | Ehsanibenafati et al. | |
| 2022/0244727 A1 | 8/2022 | Bojarski et al. | |
| 2022/0258738 A1* | 8/2022 | Jia | G06V 20/588 |
| 2022/0258739 A1 | 8/2022 | Monteuuis et al. | |
| 2022/0277569 A1* | 9/2022 | Heyl | B60W 30/08 |
| 2023/0322259 A1* | 10/2023 | Sadek | G01C 21/32 |
| | | | 701/23 |

FOREIGN PATENT DOCUMENTS

| | | | | |
|---|---|---|---|---|
| EP | 4047563 A1 | 8/2022 | | |
| WO | WO-2020257642 A1 * | 12/2020 | ......... | G06Q 10/063 |
| WO | 2022140660 A1 | 6/2022 | | |

OTHER PUBLICATIONS

"Janssen, H; Niehsen, W; Vehicle Surround Sensing based on Information Fusion of Monocular Video and Digital Map; 2004; 2004 IEEE Intelligent Vehicles Symposium University of Parma, Parma, Italy Jun. 14-17, 2004" (Year: 2004).*

Extended European Search Report; Application No. 23165276.9; Completed: Sep. 14, 2023; Issued: Sep. 22, 2023; 10 Pages.

* cited by examiner

METHOD OF CONTROLLING VEHICLE FUNCTIONS, VEHICLE PROCESSING SYSTEM, VEHICLE, AND MACHINE-READABLE INSTRUCTION CODE

TECHNICAL FIELD

Embodiments of the invention relate to techniques associated with controlling functions of a vehicle, in particular functions related to autonomous driving and/or driver assistance. Embodiments of the invention relate in particular to methods and systems operative to ensure a Safety of an Intended Functionality (SOTIF). Embodiments of the invention also relate to methods of and vehicle processing systems for controlling at least one vehicle actuator in a manner which ensures SOTIF. Embodiments of the invention also relate to methods of and vehicle processing systems for perception based on at least one vehicle sensor in a manner which ensures SOTIF.

BACKGROUND

Techniques that provide assistance to a driver of a vehicle and/or that autonomously perform vehicle control operations are gaining popularity. In addition to enhanced convenience for a driver, or the potential of alleviating human vehicle occupants from most control operations, such techniques have the potential of eliminating human errors that can cost lives. Such techniques include, without limitation, driver assistance systems, advanced driver assistance systems (ADAS), Highly Automated Driving (HAD) systems, and/or autonomous driving systems. Such techniques may use perception, i.e., the processing and interpretation of data captured by a vehicle sensor for providing assistance, such as autonomous driving functions, ADAS functions, or HAD system functions.

ADAS or autonomous driving systems perform operations based on input, such as signals or data captured by sensors or other data, such as map data. Control circuitry of the vehicle may process the input to determine which function is to be performed and may initiate execution of the function. The processing and interpretation is also referred to as perception. While the processing of the input to determine the function, in accordance with a processing scheme performed by the control circuitry, works well in the vast majority of situations, there may be situations that have the potential of affecting the safety of the vehicle. Examples of such situations include situations in which at least some of the inputs processed by the control circuitry does not adequately reflect the current situation. For illustration rather than limitation, such situations that have the potential of adversely affecting safety of the vehicle may comprise occlusions of a sensor that captures image or distance information. Thus, an unsafe situation can lead to performance limitations for some of the input data processed to determine which function(s) is/are to be executed.

To reduce or eliminate the risk of unsafe situations for a vehicle, unsafe situations can be detected. ISO 21448, road safety, Safety of the Intended Functionality (SOTIF), provides guidelines to identify the unsafe situations from an intended functionality perspective by identification of triggering conditions effecting performance limitations.

There is a need in the art for enhanced techniques of providing driver assistance or autonomous driving functionality which mitigate the risk of unsafety for the vehicle when one or several function(s) to be performed are determined using sensor data.

SUMMARY

It is an object of embodiments of the invention to provide methods, systems, and devices that provide or utilize enhanced techniques of determining function(s) to be performed for driver assistance or autonomous driving. It is also desirable to provide methods, systems, and devices which mitigate the risk of unsafety for the vehicle.

According to embodiments of the invention, a method, a processing system, and machine-readable instruction code as recited in the independent claims are provided. The dependent claims define preferred and advantageous embodiments.

According to embodiments, the function(s) to be performed are determined based on a fusion of map data and sensor data. By using the map data in addition to the vehicle sensor data, the map data can assist perception functions and provide confidence on detected features. To ensure Safety of the Intended Functionality (SOTIF), the manner in which map data and sensor data are used to determine the function(s) to be performed is dependent on a detected situation.

According to an aspect of the invention, a method of controlling vehicle functions is provided. The method comprises retrieving, by at least one processing circuit, vehicle sensor data and map data. The method comprises determining, by the at least one processing circuit, at least one function that is to be performed. The method comprises causing, by the at least one processing circuit, execution of the at least one function. Determining the at least one function comprises performing a fusion of the vehicle sensor data and the map data. The fusion is performed based on at least one confidence value for at least one of the vehicle sensor data and the map data. The at least one confidence value determines a relative impact of the vehicle sensor data and the map data in performing the fusion. The method further comprises ensuring a SOTIF. Ensuring the SOTIF comprises performing, by the at least one processing circuit, a situation analysis to detect a situation that has a potential to impact safety of the vehicle, and adjusting, by the at least one processing circuit, the at least one confidence value based at least on the situation analysis.

Various effects and advantages are associated with the control method. By using the map data, in combination with the vehicle sensor data, the map data can assist perception functions and provide confidence on detected features. By controlling the at least one confidence value based on the detected situation, the manner in which the map data and the vehicle sensor data are combined to determine the at least one function is adjusted in dependence on whether the detected situation has the effect of causing a degradation in confidence in the map data, the vehicle sensor data, or both. Adjusting the relative impact of the vehicle sensor data and the map data when determining the at least one function, thereby contributing to SOTIF.

The situation analysis may be performed based at least on the vehicle sensor data and/or the map data.

This configuration provides the effect that the vehicle sensor and/or map data may be used to detect a situation that has the potential of affecting vehicle safety. For illustration, the at least one processing circuit may be operative to detect occlusions in image or range data. Alternatively, or additionally, the at least one processing circuit may be operative to detect reflections in sensor data (e.g., in image data). In either case, the relative impact of the vehicle sensor data in the fusion is reduced by a corresponding adjustment of the confidence value(s). For further illustration, a global navigation satellite system (GNSS) receiver signal may be processed by the at least one processing circuit to determine a positioning error which affects the confidence in the map data in the sensor fusion. In this case, the relative impact of the map data in the fusion is reduced by a corresponding adjustment of the confidence value(s). For still further illustration, the at least one processing circuit may determine based on the map data that lane information is missing in the map data. In this case, the relative impact of the map data in the fusion may be reduced by a corresponding adjustment of the confidence value(s). SOTIF is enhanced in an efficient manner.

The method may further comprise retrieving, by the at least one processing circuit, information over a wide area network, wherein the retrieved information is related to at least one of a vehicle location and a vehicle operation state, wherein the situation analysis is performed based at least on the retrieved information.

This configuration provides the effect that data aggregated in and provided by a remote data resource (such as a server) is retrieved and used by the at least one processing circuit. For illustration, the at least one processing circuit may retrieve, via the vehicle communication interface, weather data from a remote data resource (such as a weather data server). The weather data may be processed by the at least one processing circuit to determine that a relative impact of the camera or ranging data is to be reduced (e.g., if there is heavy fog having a visibility range of less than a visibility range threshold). For further illustration, the at least one processing circuit may alternatively or additionally retrieve, via the vehicle communication interface, road network related data aggregated by a remote data resource (such as a map data server) and indicating an occlusion as previously reported by several fleet vehicles of a vehicle fleet passing through a same location of a road network as the vehicle. The road network related data may comprise information on road maintenance work which causes the confidence in the map data to be reduced, so that the relative impact of the map data is reduced in the fusion by a corresponding adjustment of the at least one confidence value. For still further illustration, the at least one processing circuit may alternatively or additionally retrieve, via the vehicle communication interface, traffic data indicating heavy traffic or a traffic jam, which increases the likelihood of occlusions. The relative impact of camera or ranging data is reduced in the fusion by a corresponding adjustment of the at least one confidence value. Ultimately, SOTIF is enhanced.

The retrieved information may comprise one, several, or all of: weather data, traffic data, road maintenance work data, information aggregated from a vehicle fleet.

This configuration provides the effect that various sources may be used to detect various situations. SOTIF is enhanced.

Ensuring the SOTIF may further comprise performing, by the at least one processing circuit, a causality analysis that quantifies a degradation in confidence in the vehicle sensor data and/or the map data, wherein the at least one confidence value is adjusted based on both the situation analysis and the causality analysis.

This configuration provides the effect that the at least one processing circuit verifies that the detected situation is causally linked to a reduced confidence in the vehicle sensor data and/or map data. The adjustment of the at least one confidence value may be performed conditionally dependent on whether the determined situation is causally linked to the reduced confidence in the vehicle sensor data and/or map data. SOTIF is enhanced.

The causality analysis may comprise determining, for the detected situation, a rate of false decisions taken based on the vehicle sensor data and/or the map data for the detected situation prior to adjustment of the at least one confidence value.

This configuration provides the effect that the presence or absence of causality between the detected situation and the reduction in confidence in the vehicle sensor data and/or the map data is quantitatively assessed. The rate of false decisions may be used by the at least one processing circuit to determine by how much the confidence value(s) are to be adjusted, i.e., how strongly the relative impact of the vehicle sensor data and the map data is to be shifted in the fusion. SOTIF is enhanced thereby.

The rate of false decisions may be determined using at least one of a Bayesian network, a fault analysis tree, a machine learning (ML) model.

This configuration provides the effect that the causality may be quantified efficiently during vehicle operation where time is of essence. The Bayesian network, fault analysis tree, or ML model may be generated offboard the vehicle and may be persistently stored in the vehicle for use by the at least one processing circuit and/or may be retrieved for use via a vehicle communication interface. Efficient processing during runtime is attained thereby, contributing to SOTIF.

Performing the situation analysis may comprise determining a positional accuracy. The relative impact of the map data may be reduced by a corresponding adjustment of the confidence value(s) performed by the at least one processing circuit to take into account the reduced positional accuracy on the confidence in the map data.

This configuration provides the effect that an important source of reduced confidence in the map data is identified automatically, and the at least one processing circuit reduced the relative impact of the map data relative to the vehicle sensor data in response thereto. SOTIF is enhanced thereby.

Alternatively, or additionally, performing the situation analysis may comprise selecting the situation from a set of pre-defined situations. The set of pre-defined situations may be determined by one or several computing resources remote from the vehicle and prior to runtime of the vehicle control method.

This configuration provides the effect that the task of identifying which possible situations may exist does not need to be performed onboard the vehicle. The one or several computing resources remote from the vehicle may determine the set of pre-defined situations in a data-driven manner based on data aggregated from several vehicles. Supervised processing techniques may be used to determine the set of possible situations based on the data. SOTIF can be ensured in an efficient manner during field use of the pre-defined situations on board the vehicle.

The method may further comprise providing, by the at least one processing circuit, update information for updating the set of pre-defined situations.

This configuration provides the effect that the model of pre-defined situations is continually updated and improved during field use of vehicles that use the model of pre-defined situations. SOTIF is enhanced.

The at least one function may comprise an autonomous driving function. The autonomous driving function may comprise controlling, by the at least one processing circuit, at least one actuator (such as an engine speed control actuator, a steering direction actuator, a braking actuator) automatically based on the fusion of the vehicle sensor data and the map data.

This configuration provides the effect that SOTIF of functions that involve automatic actuator control operations is enhanced. For such operations, SOTIF is particularly critical.

The at least one function may comprise a driver assist function, which may optionally comprise an advanced driver assistance system (ADAS) function and/or a Highly Automated Driving (HAD) function. The driver assist function may comprise controlling, by the at least one processing circuit, at least one actuator (such as an engine speed control actuator, a steering direction actuator, a braking actuator).

This configuration provides the effect that SOTIF of driver assistance functions is improved.

The at least one function may comprise (i) an actuator operation function that causes operation of at least one actuator of a vehicle and (ii) a fallback function. Determining the at least one function may comprises determining, based on the situation analysis and, if performed, the causality analysis, which one of the actuator operation function and the fallback function is to be performed.

This configuration provides the effect that fallback functions may be executed in case SOTIF cannot be guaranteed for the primary function. For illustration, if the situation analysis and, if performed, the causality analysis show that both confidence in the map data and confidence in the vehicle sensor data (such as image and/or ranging data) is reduced for the detected situation, the fallback function may be performed.

The actuator operation function may comprise one or several of: a steering function, a braking function, an engine control function.

This configuration provides the effect that SOTIF may be ensured for autonomous driving and driver assistance functions that influence vehicle speed and/or driving direction.

The fallback function may comprise a substitute actuator operation function different from the actuator operation function and/or a human machine interface (HMI) control operation. The substitute actuator operation may comprise a braking operation to reduce vehicle speed or an operation that warns the driver (such as by providing tactile feedback to the driver).

This configuration provides the effect that SOTIF may be ensured for the substitute actuator or an HMI output operation if safety of the vehicle is at risk if the primary function were performed.

The vehicle sensor data may comprise one or several of: image data captured by a vehicle onboard camera, ranging data captured by a vehicle ranging sensor, location data.

This configuration provides the effect that SOTIF is ensured for functions that are based on a wide variety of vehicle sensors in combination with map data.

The at least one processing circuit may comprise at least one vehicle onboard processing circuit that determines the at least one function and causes execution of the at least one function.

This configuration provides the effect of ensuring low latency by obviating the need for wireless communication with a remote resource when determining the at least one function.

The at least one processing circuit may comprise at least one remote processing circuit that determines the at least one function and is remote from the vehicle. The vehicle may be communicatively interfaced with the remote processing circuit(s) to receive an indication of the function(s) to be performed.

This configuration provides the effect that more powerful computational resources remote from the vehicle may be used for determining the function. This is a viable option in particular when data transmission latencies are low and/or time is not essential for a given function.

Execution of the at least one function may comprise controlling at least one vehicle actuator.

This configuration provides the effect of ensuring SOTIF for a function that involves control of at least one vehicle actuator.

According to another aspect of the invention, there is provided a vehicle processing system. The vehicle processing system comprises an interface operative to receive vehicle sensor data and map data. The vehicle processing system comprises at least one processing circuit operative to determine at least one function that is to be performed and cause execution of the at least one function. The at least one processing circuit is operative to perform a fusion of the vehicle sensor data and map data, based on at least one confidence value for at least one of the vehicle sensor data and the map data, to determine the at least one function. The at least one confidence value determines a relative impact of the vehicle sensor data and the map data in performing the fusion. The at least one processing circuit is operative to perform a process to ensure a SOTIF, wherein the process to ensure the SOTIF comprises performing a situation analysis to detect a situation that has a potential to impact safety of the vehicle, and adjusting, by the at least one processing circuit, the at least one confidence value based at least on the situation analysis.

Various effects and advantages are associated with the vehicle processing system. By using the map data, in combination with the vehicle sensor data, the map data can assist perception functions and provide confidence on detected features. By controlling the at least one confidence value based on the detected situation, the manner in which the map data and the vehicle sensor data are combined to determine the at least one function is adjusted in dependence on whether the detected situation has the effect of causing a degradation in confidence in the map data, the vehicle sensor data, or both. Adjusting the relative impact of the vehicle sensor data and the map data when determining the at least one function, thereby contributing to SOTIF.

The vehicle processing system may be operative to perform the method of any aspect or embodiment disclosed herein. The effects disclosed in association with optional features of the control method apply mutatis mutandis to the optional features present in the vehicle processing system according to embodiments.

The at least one processing circuit may be operative to perform the situation analysis based at least on the vehicle sensor data and/or the map data.

This configuration provides the effect that the vehicle sensor and/or map data may be used to detect a situation that has the potential of affecting vehicle safety. For illustration, the at least one processing circuit may be operative to detect occlusions in image or range data. Alternatively, or additionally, the at least one processing circuit may be operative to detect reflections in sensor data (e.g., in image data). In either case, the at least one processing circuit may be operative such that the relative impact of the vehicle sensor data in the fusion is reduced by a corresponding adjustment of the confidence value(s). For further illustration, a global navigation satellite system (GNSS) receiver signal may be processed by the at least one processing circuit to determine a positioning error which affects the confidence in the map data in the sensor fusion. In this case, the at least one processing circuit may be operative such that the relative impact of the map data in the fusion is reduced by a corresponding adjustment of the confidence value(s). For still further illustration, the at least one processing circuit may determine based on the map data that lane information is missing in the map data. In this case, the at least one processing circuit may be operative such that the relative impact of the map data in the fusion may be reduced by a corresponding adjustment of the confidence value(s). SOTIF is enhanced in an efficient manner.

The at least one processing circuit may be operative to retrieve information over a wide area network, wherein the retrieved information is related to at least one of a vehicle location and a vehicle operation state, wherein the situation analysis is performed based at least on the retrieved information.

This configuration provides the effect that data aggregated in and provided by a remote data resource (such as a server) is retrieved and used by the at least one processing circuit. For illustration, the at least one processing circuit may be operative to retrieve, via the vehicle communication interface, weather data from a remote data resource (such as a weather data server). The at least one processing circuit may be operative to process the weather data to determine that a relative impact of the camera or ranging data is to be reduced (e.g., if there is heavy fog having a visibility range of less than a visibility range threshold). For further illustration, the at least one processing circuit may alternatively or additionally be operative to retrieve, via the vehicle communication interface, road network related data aggregated by a remote data resource (such as a map data server) and indicating an occlusion as previously reported by several fleet vehicles of a vehicle fleet passing through a same location of a road network as the vehicle. The road network related data may comprise information on road maintenance work which causes the confidence in the map data to be reduced, so that the at least one processing circuit may be operative to reduce the relative impact of the map data in the fusion by a corresponding adjustment of the at least one confidence value. For still further illustration, the at least one processing circuit may alternatively or additionally be operative to retrieve, via the vehicle communication interface, traffic data indicating heavy traffic or a traffic jam, which increases the likelihood of occlusions. The at least one processing circuit may be operative to reduce the relative impact of camera or ranging data in the fusion by a corresponding adjustment of the at least one confidence value. Ultimately, SOTIF is enhanced.

The at least one processing circuit may be operative such that the retrieved information may comprise one, several, or all of: weather data, traffic data, road maintenance work data, information aggregated from a vehicle fleet.

This configuration provides the effect that various sources may be used to detect various situations. SOTIF is enhanced.

The at least one processing circuit may be operative such that ensuring the SOTIF further comprises performing, by the at least one processing circuit, a causality analysis that quantifies a degradation in confidence in the vehicle sensor data and/or the map data, wherein the at least one confidence value is adjusted based on both the situation analysis and the causality analysis.

This configuration provides the effect that the at least one processing circuit verifies that the detected situation is causally linked to a reduced confidence in the vehicle sensor data and/or map data. The at least one processing circuit may be operative such that the adjustment of the at least one confidence value may be performed conditionally dependent on whether the determined situation is causally linked to the reduced confidence in the vehicle sensor data and/or map data. SOTIF is enhanced.

The at least one processing circuit may be operative such that the causality analysis comprises determining, for the detected situation, a rate of false decisions taken based on the vehicle sensor data and/or the map data for the detected situation prior to adjustment of the at least one confidence value.

This configuration provides the effect that the presence or absence of causality between the detected situation and the reduction in confidence in the vehicle sensor data and/or the map data is quantitatively assessed. The at least one processing circuit may be operative such that the rate of false decisions is used to determine by how much the confidence value(s) are to be adjusted, i.e., how strongly the relative impact of the vehicle sensor data and the map data is to be shifted in the fusion. SOTIF is enhanced thereby.

The at least one processing circuit may be operative such that the rate of false decisions is determined using at least one of a Bayesian network, a fault analysis tree, a machine learning (ML) model.

This configuration provides the effect that the causality may be quantified efficiently during vehicle operation where time is of essence. The Bayesian network, fault analysis tree, or ML model may be generated offboard the vehicle and may be persistently stored in the vehicle for use by the at least one processing circuit and/or may be retrieved for use via a vehicle communication interface. Efficient processing during runtime is attained thereby, contributing to SOTIF.

The at least one processing circuit may be operative such that the situation analysis comprises determining a positional accuracy. The relative impact of the map data may be reduced by a corresponding adjustment of the confidence value(s) performed by the at least one processing circuit to take into account the reduced positional accuracy on the confidence in the map data.

This configuration provides the effect that an important source of reduced confidence in the map data is identified automatically, and the at least one processing circuit reduced the relative impact of the map data relative to the vehicle sensor data in response thereto. SOTIF is enhanced thereby.

Alternatively, or additionally, the at least one processing circuit may be operative such that performing the situation analysis comprises selecting the situation from a set of pre-defined situations. The set of pre-defined situations may be determined by one or several computing resources remote from the vehicle and prior to runtime of the vehicle control method.

This configuration provides the effect that the task of identifying which possible situations may exist does not need to be performed onboard the vehicle. The one or several computing resources remote from the vehicle may determine the set of pre-defined situations in a data-driven manner based on data aggregated from several vehicles. Supervised processing techniques may be used to determine the set of possible situations based on the data. SOTIF can be ensured in an efficient manner during field use of the pre-defined situations on board the vehicle.

The at least one processing circuit may be operative to provide, via a vehicle communication interface, update information for updating the set of pre-defined situations.

This configuration provides the effect that the model of pre-defined situations is continually updated and improved during field use of vehicles that use the model of pre-defined situations. SOTIF is enhanced.

The at least one processing circuit may be operative such that the at least one function may comprise an autonomous driving function. The autonomous driving function may comprise controlling, by the at least one processing circuit, at least one actuator (such as an engine speed control actuator, a steering direction actuator, a braking actuator) automatically based on the fusion of the vehicle sensor data and the map data.

This configuration provides the effect that SOTIF of functions that involve automatic actuator control operations is enhanced. For such operations, SOTIF is particularly critical.

The at least one processing circuit may be operative such that the at least one function may comprise a driver assist function, which may optionally comprise an advanced driver assistance system (ADAS) function and/or a Highly Automated Driving (HAD) function. The driver assist function may comprise controlling, by the at least one processing circuit, at least one actuator (such as an engine speed control actuator, a steering direction actuator, a braking actuator).

This configuration provides the effect that SOTIF of driver assistance functions is improved.

The at least one processing circuit may be operative such that the at least one function may comprise (i) an actuator operation function that causes operation of at least one actuator of a vehicle and (ii) a fallback function. Determining the at least one function may comprises determining, based on the situation analysis and, if performed, the causality analysis, which one of the actuator operation functions and the fallback function is to be performed.

This configuration provides the effect that fallback functions may be executed in case SOTIF cannot be guaranteed for the primary function. For illustration, if the situation analysis and, if performed, the causality analysis show that both confidence in the map data and confidence in the vehicle sensor data (such as image and/or ranging data) is reduced for the detected situation, the fallback function may be performed under the control of the at least one processing circuit.

The at least one processing circuit may be operative such that the actuator operation function comprises one or several of: a steering function, a braking function, an engine control function.

This configuration provides the effect that SOTIF may be ensured for autonomous driving and driver assistance functions that influence vehicle speed and/or driving direction.

The at least one processing circuit may be operative such that the fallback function comprises a substitute actuator operation function different from the actuator operation function and/or a human machine interface (HMI) control operation. The substitute actuator operation may comprise a braking operation to reduce vehicle speed or an operation that warns the driver (such as by providing tactile feedback to the driver).

This configuration provides the effect that SOTIF may be ensured for the substitute actuator or an HMI output operation if safety of the vehicle is at risk if the primary function were performed.

The processing system may be operative such that the vehicle sensor data comprise one or several of: image data captured by a vehicle onboard camera, ranging data captured by a vehicle ranging sensor, location data.

This configuration provides the effect that SOTIF is ensured for functions that are based on a wide variety of vehicle sensors in combination with map data.

The at least one processing circuit may be operative to control at least one vehicle actuator to perform the at least one function.

This configuration provides the effect of ensuring SOTIF for a function that involves control of at least one vehicle actuator.

The vehicle processing system may comprise an interface that communicatively interfaces the at least one processing circuit with a board network of the vehicle.

This configuration provides the effect of allowing the actuator(s) to be controlled via the board network, in a manner which ensures SOTIF.

According to another aspect of the invention, a vehicle is provided. The vehicle comprises at least one actuator and the vehicle processing system of any aspect or embodiment disclosed herein. The vehicle processing system may be operative to control the at least one actuator to cause execution of the at least one function.

According to another aspect of the invention, there is disclosed machine-readable instruction code comprising instructions which, when executed by at least one processing circuit, cause the at least one processing circuit to perform the method of any one aspect or embodiment.

According to another aspect of the invention, there is disclosed a data carrier comprising machine-readable instruction code comprising instructions which, when executed by at least one processing circuit, cause the at least one processing circuit to perform the method of any one aspect or embodiment.

The data carrier may comprise a non-transitory storage medium having stored thereon the machine-readable instruction code.

According to further embodiments, there is disclosed a use of the method, the vehicle processing system, the vehicle and/or the machine-readable instruction code for ensuring SOTIF for at least one function of a vehicle. The at least one function may comprise an autonomous driving function or a driver assistance function.

In the methods, systems, and instruction codes according to embodiments, a situation analysis may be comprised by a scenario analysis of analyzing a scenario in accordance with ISO 21448 (e.g., ISO 21448 of Jan. 10, 2019). The method may comprise performing a scenario analysis which comprises the situation analysis, to thereby identify a scenario that is composed of several scenes as acquired by the vehicle sensor data, without being limited thereto.

While the techniques disclosed herein may be used for driver assistance and autonomous driving functions, they are not limited thereto.

BRIEF DESCRIPTION OF THE DRAWINGS

Embodiments of the invention will be described with reference to the drawings in which similar or corresponding reference signs designate elements having similar or corresponding configuration and/or function.

DETAILED DESCRIPTION

Embodiments of the invention will be described in detail. While embodiments will be described in association with autonomous driving or driver assistance functions, the embodiments are not limited thereto.

The features of embodiments may be combined with each other unless specifically stated otherwise.

The techniques disclosed herein in detail may be used to perform automatic control operations of actuators of a vehicle in a manner which ensures Safety of the Intended Functionality (SOTIF). The techniques disclosed herein combine vehicle sensor data and map data in a fusion to determine which function is to be performed. A relative impact of the map data and the vehicle sensor data is adjusted in response to detection of a situation that has a potential to affect safety of the vehicle. Causality of the detected situation and a reduced confidence in one or both of the map data and the vehicle sensor data may be ascertained (e.g., by quantifying the causality using techniques such as Bayesian networks, fault trees, or similar) to determine how much the relative impact of the map data and the vehicle sensor data is to be adjusted. A fallback mechanism may be provided to perform a function known to be safe if the detected situation may cause a signification degradation for both map data and sensor data.

As used herein, vehicle sensor data refers to data captured using one or several sensors that may be located (e.g., installed) onboard the vehicle or that are otherwise related to the vehicle. The vehicle sensor data may comprise data captured using a device (such as a portable navigation device) which can be arranged in or on the vehicle in a reversibly removable manner.

As used herein, SOTIF may comprise or may be a SOTIF in accordance with ISO 21448, road safety. SOTIF may be compatible with ISO 21448 of Jan. 10, 2019.

As used herein, ensuring SOTIF refers to preventing, or at least significantly reducing, unacceptable functionality failures for known situations.

As used herein, a situation may be comprised by a scenario or may be a scene in accordance with ISO 21448 (e.g., ISO 21448 of Jan. 10, 2019). The situation analysis may be comprised by a scenario analysis that identifies a scenario that is composed of several scenes as acquired by the vehicle sensor data, without being limited thereto.

As used herein, at least one confidence value that determines a relative impact of the vehicle sensor data and the map data may be a value of a belief function, such as a probability mass.

As used herein, performing a situation analysis to detect a situation may encompass techniques that provide probability values for the situation to be present. Thus, situation detection does not need to imply that a situation is detected with absolute certainty. Probabilities may be determined that quantify whether a situation or various situations are present, based on the situation analysis (which may be part of a scenario analysis).

Figure 1:
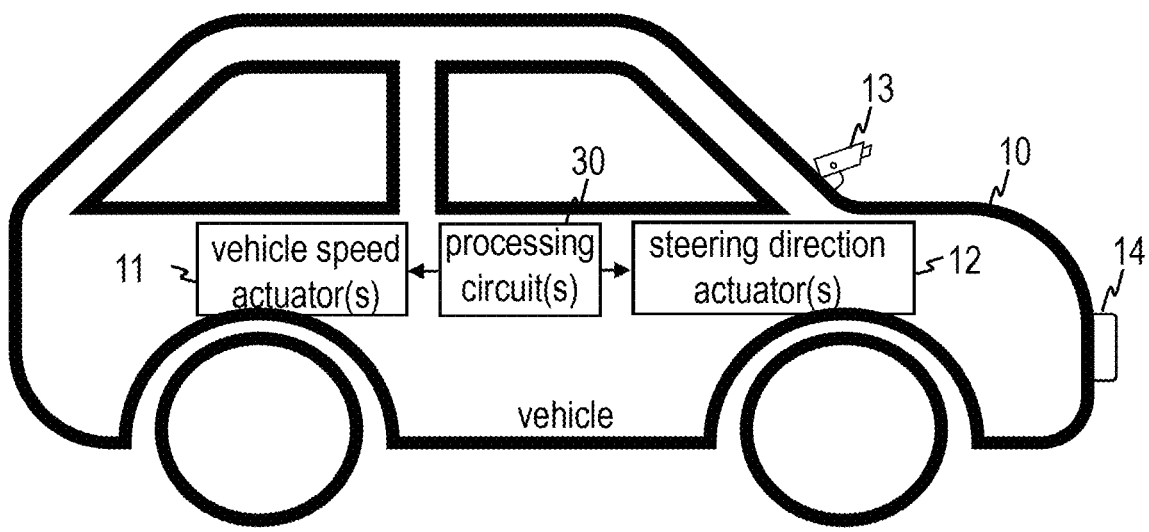
FIG. 1 is a diagram of a vehicle comprising a vehicle processing system.

FIG. 1 is a schematic representation of a vehicle 10 according to an embodiment. The vehicle 10 comprises one or several actuators controlled by at least one processing circuit 20. The one or several actuators may comprise at least one vehicle speed actuator 11 (which may control an engine or brake) and/or a steering direction actuator (which may control wheel steering orientation).

The vehicle 10 comprises at least one vehicle sensor. The at least one vehicle sensor may comprise a camera 13, a ranging sensor 14 (which may be a LIDAR-based sensor, for example), a global navigation satellite system (GNSS) receiver, and/or other sensors. The at least one vehicle sensor may be configured to capture an image of a scene or a scenario (in accordance with ISO 21448).

The at least one processing circuit 30 is operative to perform a fusion of map data and sensor data captured by the at least one sensor. The at least one processing circuit 30 is operative to adjust a relative impact of the map data and the vehicle sensor data in the fusion in response to detecting a situation (e.g., in response to detecting a scenario in accordance with ISO 21448) which has the potential of affecting safety of the vehicle 10. The at least one processing circuit 30 is operative to adjust confidence value(s) used in the fusion of the vehicle sensor data and the map data to adjust the relative impact, so as to ensure SOTIF. The at least one processing circuit 30 may be operative to perform the adjustment of the confidence value(s) to modify the relative impact of the vehicle sensor data and the map data, based on a causality analysis that quantifies whether (and optionally by how much) confidence in the sensor data and confidence in the map data is reduced for a detected situation (e.g., for the detected scenario in accordance with ISO 21448).

The at least one processing circuit 30 is operative to determine at least one function to be performed based on the fusion. The at least one processing circuit 30 may be operative to determine whether, and if so, one of the actuators 11, 12 is to be activated to perform the function and causes execution of the function. The at least one processing circuit 30 may be operative to directly, or indirectly control the actuator(s) 11, 12 or a human machine interface (HMI) (not shown in FIG. 1) to perform the identified function.

The operation and configuration of a vehicle processing system 20 comprising the at least one processing circuit 30 is described in more detail with reference to FIGS. 2 to 19.

Figure 2:
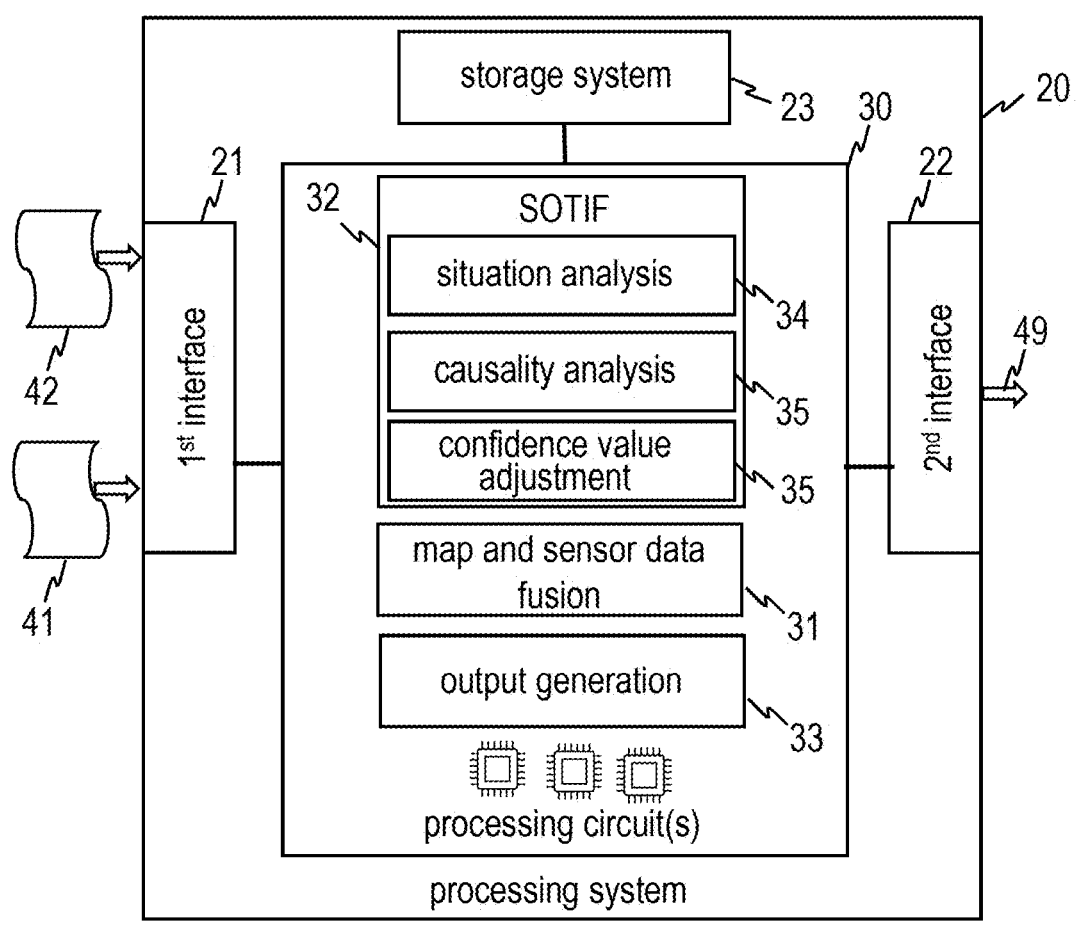
FIG. 2 is a block diagram of the vehicle processing system.

FIG. 2 is a block diagram of the vehicle processing system 20. The vehicle processing system 20 comprises an interface 21 operative to receive vehicle sensor data 41. The vehicle processing system 20 may also receive map data 42 over the interface 21 and may store the map data 42 in a storage system 23 of the vehicle processing system 20 or in a storage system accessible to the vehicle processing system 20. The vehicle processing system 20 may be operative to generate and output a command 49 for controlling at least one actuator or an HMI. The vehicle processing system 20 may be operative to output the command 49 via the interface 21 or another interface 22 that may be coupled to, e.g., a board network.

The vehicle processing system 20 comprises the storage system 23. The storage system 23 is operative to store information on situations (such as information on a set of pre-defined scenes or scenarios according to ISO 21448, such as scenarios compatible with ISO 21448 of Jan. 10, 2019) and mitigating actions for each of the situations. The mitigating action(s) may comprise instructions on how confidence value(s) are to be adjusted to change the relative impact of the vehicle sensor data and the map data for any of the scenarios. Thus, the storage system 23 may have stored therein data that indicates which scenarios reduce confidence in the vehicle sensor data and which scenarios reduce confidence in the map data.

The vehicle processing system 20 comprises at least one processing circuit 30. The at least one processing circuit 30 may comprise any one or any combination of integrated circuits, integrated semiconductor circuits, processors, controllers, application specific integrated circuits (ASICs), field programmable gate arrays (FPGAs), circuit(s) including quantum bits (qubits) and/or quantum gates, without being limited thereto.

The at least one processing circuit 30 is operative to perform a fusion 31 of map data and vehicle sensor data. The fusion 31 may be performed in various ways. For illustration, a fusion engine may be operative to receive the map data, the vehicle sensor data, and at least one confidence value (such as a probability mass for the map data and/or the vehicle sensor data) and may generate an output that determines which function(s) is/are to be performed. In one implementation, the fusion engine may combine a function determination based on the map data, weighted by a probability mass for the map data, and based on the vehicle sensor data, weighted by a probability mass for the vehicle sensor data. The probability mass(es) may be adjusted by a SOTIF module 32 to give the map data greater weight if a detected situation reduces confidence in the vehicle sensor data used to determine which function is to be executed.

The at least one processing circuit 30 is operative to perform an output generation 33 to cause the command 49 to be generated and output, based on a result of the fusion 31.

The at least one processing circuit 30 is operative to execute a SOTIF module 32 that ensures SOTIF (e.g., SOTIF compatible with ISO 21448, e.g., of Jan. 10, 2019). The SOTIF module 32 performs a situation analysis 34. The situation analysis 34 may but is not limited to analyzing a scene (i.e., a snapshot indicative of a vehicle's environment at a given time) but may be part of a scenario analysis that identifies a scenario (i.e., a sequence of scenes; the sequence of scenes of the scenario may be branched, with branching points being defined by events and/or actions). As a result of the situation analysis 34, a situation or scenario to which the vehicle 10 is presently exposed is identified.

The at least one processing circuit 30 may be operative to perform a causality analysis 35. The causality analysis 35 may use a Bayesian network (BN) or other processing (such as a fault tree analysis (FTA) or a trained machine learning (ML) model) to quantify the impact of the detected situation (e.g., of a detected scenario) on false positives and false negatives of decisions taken based on the map data and the sensor data. The causality analysis may be performed onboard the vehicle 10, but may use data generated prior to the function control and stored in the storage system 23. This data may comprise parameters of the BN, FTA, or ML, as set in a data-driven technique prior to field use of the vehicle processing system 20.

As a result of the causality analysis 35, causality of the scenario for a degradation of confidence in the map data and/or the vehicle sensor data is quantitatively assessed. For illustration, the rates of false positives (FP) and false negatives (FN) as determined by the BN for the scenario may indicate whether the scenario is causal for a change in FP or FN.

The at least one processing circuit 30 is operative to perform a confidence value adjustment 35. Thereby, the SOTIF module 32 controls how the map data and vehicle sensor data fusion 31 is performed. The confidence value adjustment 35 may comprise adjusting one or several probability mass(es) used in the fusion 31. The confidence value adjustment 35 is performed based on the situation analysis 34. The confidence value adjustment 35 may be performed further based on the causality analysis 35.

The SOTIF module 32 may be operative to determine how the relative impact of any of various vehicle sensor data and the map data is modified for performing the fusion 31. Additionally, the SOTIF module 32 may trigger a fallback mechanism if the detected situation is such that it adversely affects both the map data and the vehicle sensor data relevant for a function to such a degree that the function performed based on the fusion 31 does not have an ensured SOTIF. In this case, a fallback mechanism causes execution of a function (such as a function that brings the vehicle to a safer operating condition, e.g., by reducing the speed, or a function that alerts the driver via an HMI) that is known to comply with SOTIF.

The adjustment of the confidence value(s) (such as probability mass(es)) by the at least one processing circuit 30 may be performed in various ways. For illustration, in response to detecting occlusions in image or range data (based on the image or range data or based on weather data retrieved via a vehicle communication interface or based on vehicle-to-vehicle (V2V) communication), the at least one processing circuit may be operative to reduce the relative impact of the image or range sensor data in the fusion. Alternatively, or additionally, in response to detecting an insufficient accuracy of a position determined using a global navigation satellite system (GNSS) receiver, the at least one processing circuit 30 may be operative to determine that the positioning error affects the confidence in the map data in the sensor fusion. In this case, the relative impact of the map data in the fusion is reduced. For still further illustration, in response to detecting that lane information is missing in the map data, the at least one processing circuit 30 may be operative to reduce the relative impact of the map data in the fusion. SOTIF is ensured in an efficient manner using such techniques, by eliminating possible errors that may be caused by the situation (e.g., by a scenario) encountered by the vehicle 10.

Figure 3:
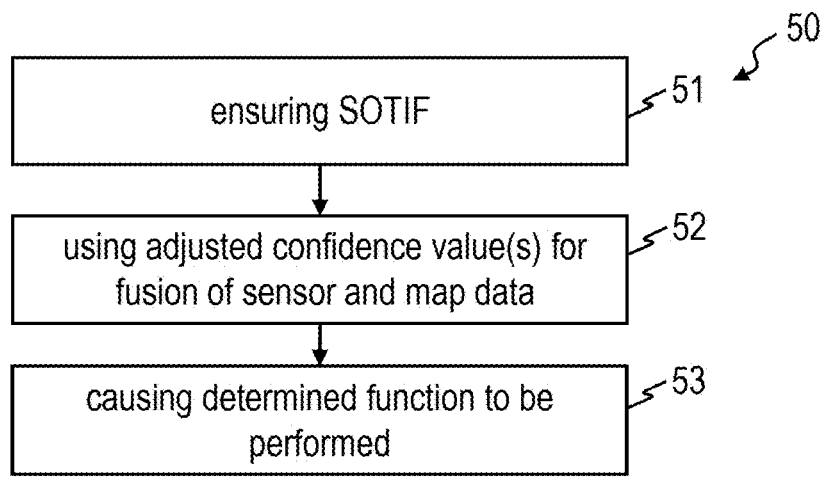
FIG. 3 is a flow chart of a method.

FIG. 3 is a flow chart of a method 50. The method may be performed automatically by a processing system 20 according to an embodiment.

At process block 51, SOTIF is ensured. Ensuring SOTIF comprises adjusting confidence value(s) that determine a relative impact of the vehicle sensor data and the map data. Adjusting the confidence value(s) may comprise adjusting one or several probability masses used in a fusion at process block 52.

At process block 52, the adjusted confidence value(s) are used in performing a fusion of the vehicle sensor data relevant for performing a given function and the map data, to thereby determine which function is to be performed.

At process block 53, execution of the determined function is caused. This may be done by controlling an actuator in accordance with the function, or controlling an HMI in a fallback mechanism if the situation causes the confidence of both the relevant vehicle sensor data and the map data to be reduced to an unacceptable degree.

Figure 4:
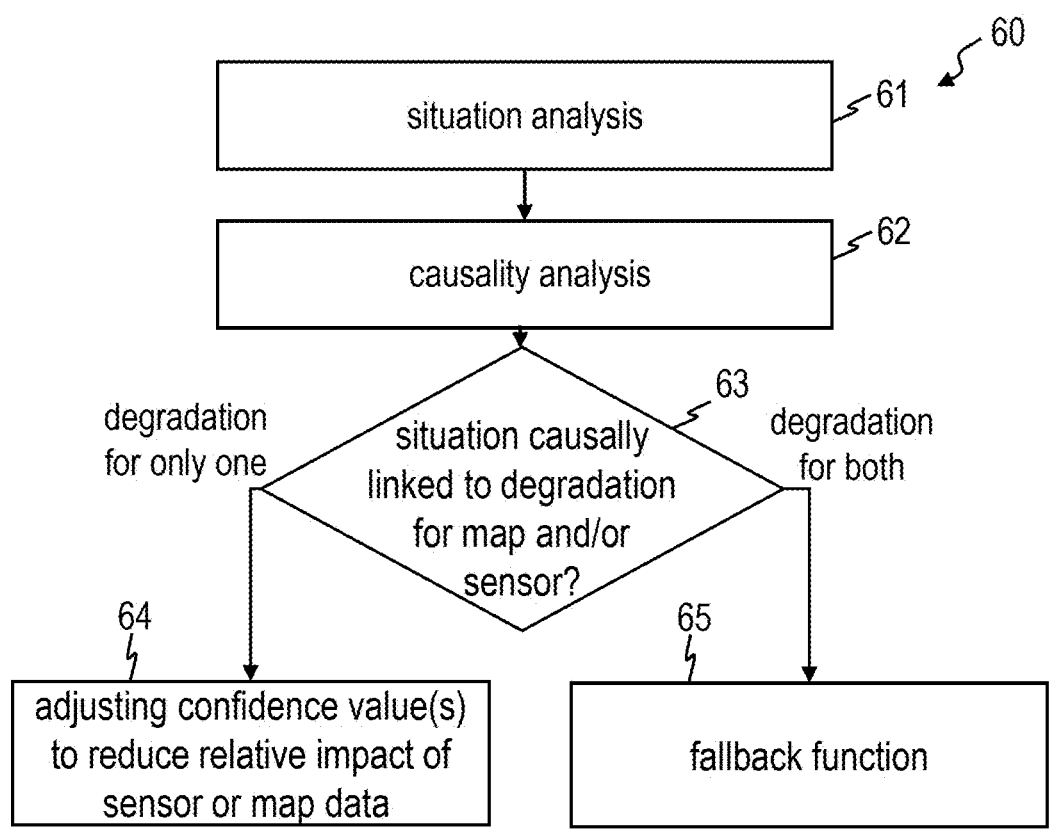
FIG. 4 is a flow chart of a process that can be used in the method of FIG. 3.

FIG. 4 is a flow chart of a process 60. The process 60 may be performed to implement process block 51 of the method 50. The process 60 may be performed automatically by a processing system 20 according to an embodiment.

At process block 61, a scenario analysis is performed. The scenario analysis may be performed based on one or several of the vehicle sensor data, the map data, and data retrieved from external data resources (such as a weather server, a map server, or other vehicles communicatively interfaced with the vehicle 10 via V2V communication). The scenario analysis 61 does not need to be limited to analyzing a snapshot of a vehicle environment, but may encompass analyzing a sequence of scenes of the vehicle environment (which may but do not need to include images of the vehicle environment).

At process block 62, a causality analysis is performed to determine whether the detected situation reduces confidence in decisions based on the map data and confidence in decisions based on the vehicle sensor data. The causality analysis 62 may use BN, FTA, or ML model to quantify the impact of the detected situation (e.g., of a detected scenario) on FP and FN of decisions taken based on the map data and the sensor data. As a result of the causality 35, causality of the scenario for a degradation of confidence in the map data and/or confidence in the vehicle sensor data is quantitatively assessed. For illustration, the rates of false positives (FP) and false negatives (FN) as determined by the BN for the scenario may indicate whether the scenario is causal for a change in FP or FN.

At process block 63, it is determined whether the detected situation is causally linked to a degradation in confidence in the map data and/or confidence in the vehicle sensor data. This determination may be based on the change in FP or FN as determined at process block 62.

At process block 64, if the detected situation causes confidence in only one of the map data and the vehicle sensor data used for the respective function to be reduced, the confidence value(s) are adjusted. This is done in such a manner that the one of the vehicle sensor data and the map data for which the confidence is reduced, is given less relative weight in determining the function.

At process block 65, if the detected situation causes confidence in both the map data and the vehicle sensor data used for the respective function to be reduced significantly (e.g., based on a threshold comparison of the false decisions determined at process block 62), a fallback function may be selected as a fallback mechanism.

If the situation causes confidence in both the map data and the vehicle sensor data to be reduced, but the confidence in at least one of the map data and the vehicle sensor data is still sufficient (as determined, e.g., based on a threshold comparison of the false decisions determined at process block 62), the adjustment may be performed as in block 64.

If the situation does not cause the confidence in the map data and the vehicle sensor data to be reduced, no adjustment of the confidence value(s) may need to be performed.

The vehicle processing system 20, the vehicle 10, and the methods according to embodiments are operative to ensure SOTIF for functions selected based on both the map data and the vehicle sensor data. Thus, the processing system 20, the vehicle 10 and the methods are operative to ensure SOTIF even in situations that have the potential of affecting vehicle safety.

Figure 5:
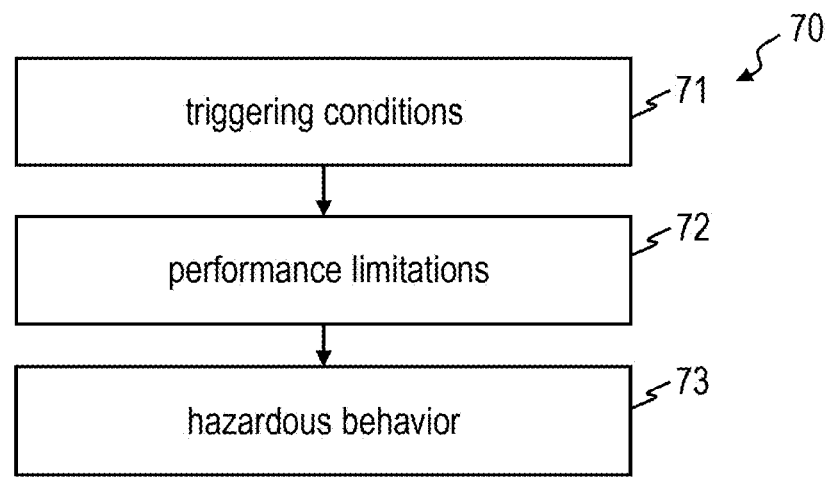
FIG. 5 shows a Safety of the Intended Functionality (SOTIF) causality flow.

FIG. 5 shows a causality flow 70 of SOTIF in accordance with ISO 21488. Triggering conditions 71 may effect performance limitations 72. The performance limitations 72 have the potential to lead to hazardous behavior 73 unless countermeasures are taken. The techniques disclosed herein provide such countermeasures to ensure SOTIF. The causality flow 70 may assist in the identification of a set of pre-defined situations (which may be included in a set of pre-defined scenarios that each comprise a sequence of scenes) that are considered to warrant a modification of the confidence value(s).

Figure 6:
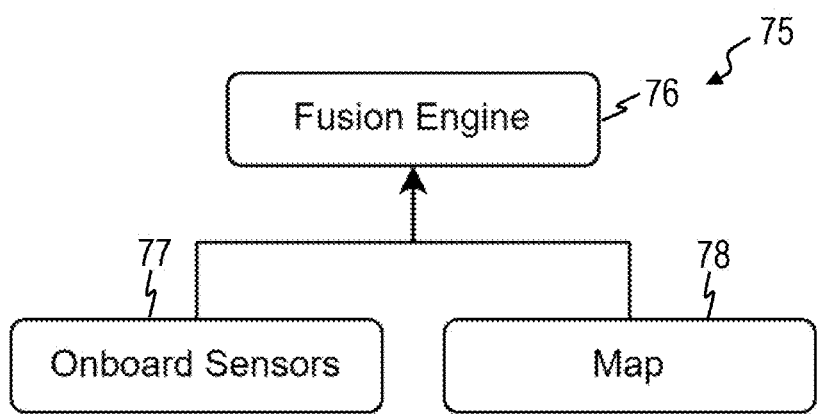
FIG. 6 shows a fusion performed by the vehicle processing system.

FIG. 6 shows a block diagram 75 illustrating the determination of a function to be performed, based on the vehicle sensor data from onboard sensors 77 and map data of a map 78. The fusion engine 76 processes the vehicle sensor data and the map data to determine which function(s) is/are to be performed.

Figure 7:
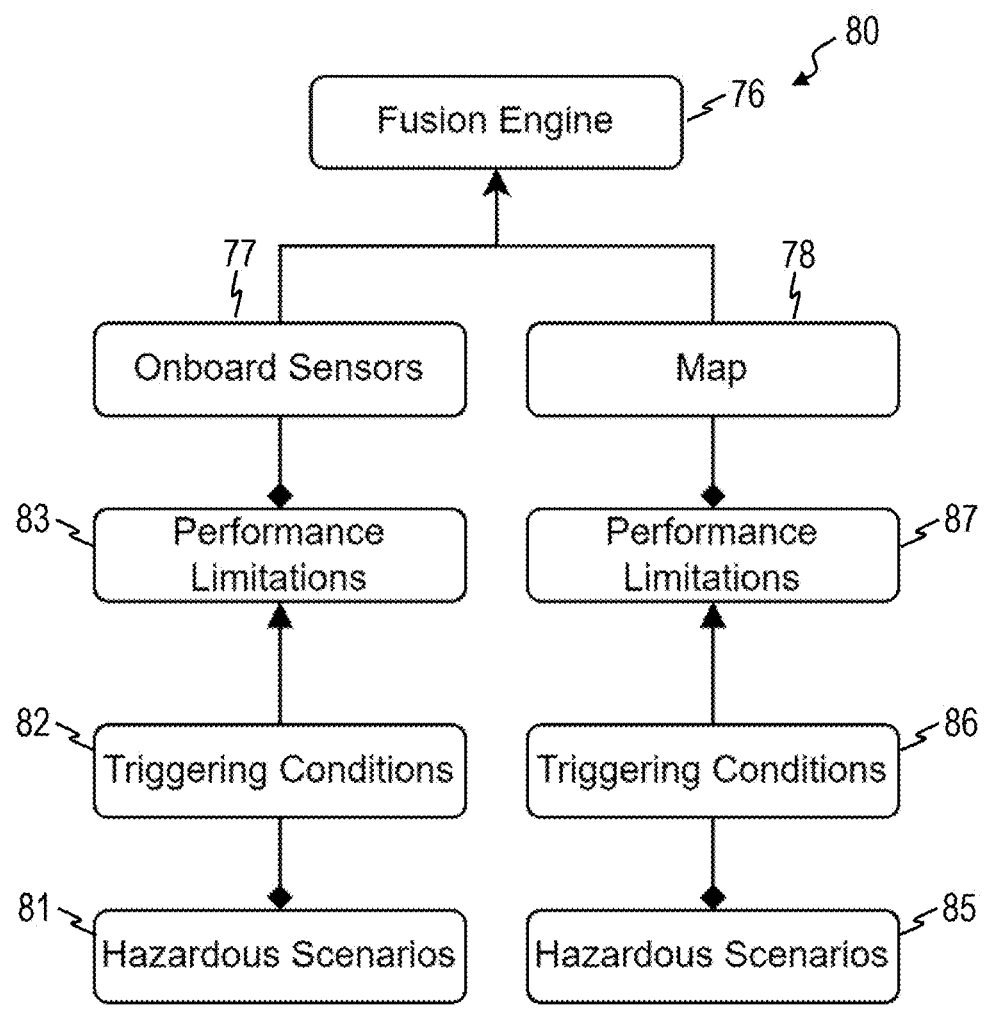
FIG. 7 shows a SOTIF causality flow for a fusion of sensor data and map data.

FIG. 7 is a block diagram 80 that illustrates the importance of ensuring SOTIF when the function to be performed is determined based on both the vehicle sensor data from onboard sensors 77 and the map data of a map 78. Hazardous scenarios 81, 85 (which may each include a sequence of scenes) or other hazardous situations may be a trigger 82, 86 for performance limitations 83, 87. The performance limitations 83, 87 may affect one or both of the confidence in the vehicle sensor data from the onboard sensors 77 and the confidence in the map data from the map 78. The methods, processing systems, and vehicles disclosed herein are operative to reduce the risk of hazardous behavior resulting in the hazardous scenarios 81, 85.

Figure 8:
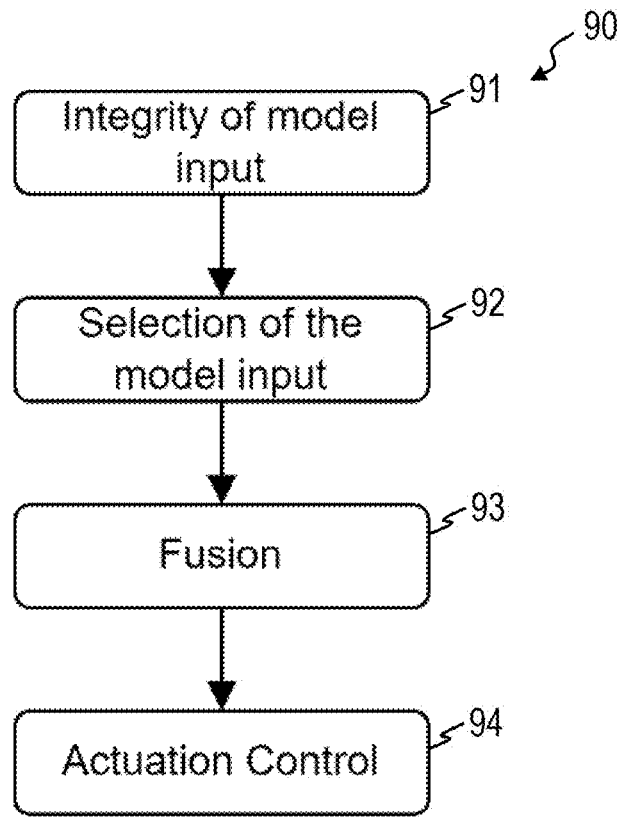
FIG. 8 is a flow chart of a method.

FIG. 8 is a block diagram of a process 90. At least process blocks 92, 93, 94 may be performed automatically by the vehicle processing system 20. Process block 91 may optionally be performed by one or several computing resources remote from the vehicle 10.

At process block 91, factors relevant to integrity of a processing model input are determined. Process block 91 may comprise an identification of unsafe scenarios. Identification of unsafe scenarios that, subsequently and during runtime operation of the at least one processing circuit 30, trigger the SOTIF module 32 may comprise an identification of performance limitations for the respective unsafe scenario. The identification of performance limitations may be based on conventional techniques, such as based on expert knowledge, standard-based (e.g., based on ISO 21448), or any other conventional technique.

For illustration rather than limitation, the performance limitations may comprise FN and FP for LIDAR detections for traffic signs for the vehicle sensor data (in case of a LIDAR sensor). The performance limitations may comprise positioning accuracy level and/or a priori knowledge of locations of regions on traffic signs for map data used for traffic sign detection and, optionally, recognition or content extraction.

Identification of unsafe scenarios may comprise determining relevant triggering conditions for each of the performance limitations.

For illustration rather than limitation, the triggering conditions may comprise occlusions, truncations, weather conditions, which may all adversely affect confidence in the vehicle sensor data for a LIDAR sensor. The triggering conditions may comprise construction sites that may adversely affect confidence in the map data.

Identification of unsafe scenarios may comprise estimating an impact of the triggering conditions for the relevant performance limitations. This may comprise determining a parameterization of determining adjustable parameters of a BN, training of parameters (and optionally hyperparameters) of a ML model, parameterization of determining adjustable parameters of a FTA, without being limited thereto. This may be done based on data aggregated from a plurality of vehicles, optionally in combination with expert knowledge (e.g., for supervised learning or verification). Estimating the impact of the triggering conditions for the relevant performance limitations may comprise estimating the FP and FN rates for LIDAR-based control functions and/or parameterizing the BN, FTA, or ML model. Estimating the impact of the triggering conditions for the relevant performance limitations may comprise estimating the quality of a mapping of map data to reality, estimating an accuracy level, and/or parameterizing the BN, FTA, or ML model that quantifies the FP and FN rates for map-based control functions.

At process block 92, an input of the respective model is selected. This is done during runtime. For illustration, only a part of the vehicle sensor data coming from specific sensors or types of sensors may be relevant for a given functionality. The selection may also comprise selecting a portion of the map data based on a location of the vehicle.

At process block 93, the fusion is performed. In the fusion, probability masses or other belief functions may be used which are dependent on the respective situation. The probability masses or other belief functions are adjusted to reflect a reduction in confidence in the map data and/or in confidence in the vehicle sensor data.

Various techniques can be used to implement the fusion based on the knowledge about the scenario. In one example, probability masses can be adjusted. In the fusion, the Dempster rule of combination can be used.

$$m_{sensor,map}(x) = \frac{1}{k-1} \sum_{y \cap z = x} m_{sensor}(y) \cdot m_{map}(z) \quad (1)$$

The constant k can be calculated as $$k = \sum_{y \cap z = \phi} m_{sensor}(y) \cdot m_{map}(z) \quad (2)$$

In equations (1) and (2), the probability mass m(·) can be calculated for the relevant performance limitation under specific triggering conditions pertinent to a given scenario.

At process block 94, an actuation control is performed to perform a function based on a result of the fusion at process block 93.

Figure 9:
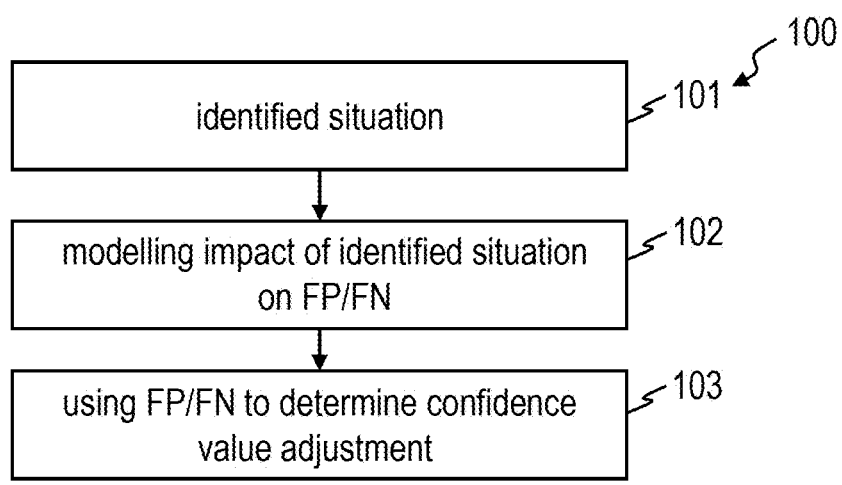
FIG. 9 is a flow chart of a process useful for performing a causality analysis in the method of FIGS. 3 and 4.

FIG. 9 is a flow chart of a procedure 100. The procedure 100 may be used to implement the causality analysis at process block 62 in FIG. 4. The procedure may use a BN, FTA, or trained ML model as obtained from aggregated data prior to runtime operation of the at least one processing circuit 30.

At process block 101, the identified situation (e.g., an identified scenario) is retrieved. The identified situation may come from any of a variety of known situation analysis techniques (such as occlusion detection techniques based on image segmentation, weather data, road map data, etc.).

At process block 102, an impact of the identified situation on the FP and/or FN rates obtained based on the vehicle sensor data and/or based on the map data is modeled. The modelling may comprise use of the BN, FTA, or trained ML model.

At process block 103, the impact as quantified in process block 102 may be used to determine how the confidence value(s) (e.g., the probability masses or other belief function values) are to be adjusted.

Figure 10:
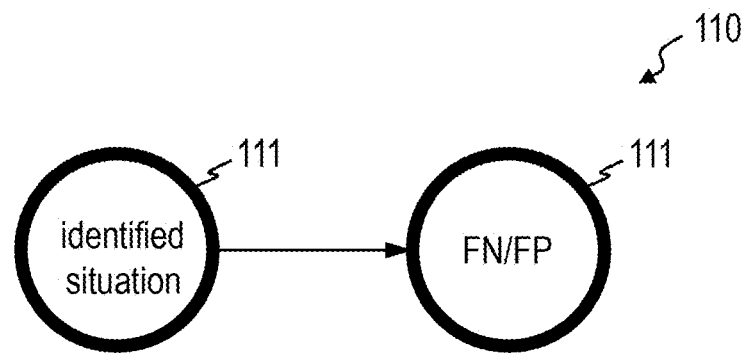
FIG. 10 is a schematic representation of a Bayesian network that may be used by the methods and vehicle processing systems.

FIG. 10 illustrates the use of a BN 110 to determine the impact of an identified situation 111. Based on the identified situation, the effect on the change in FN and FP rates is determined using the BN 110.

Figure 11:
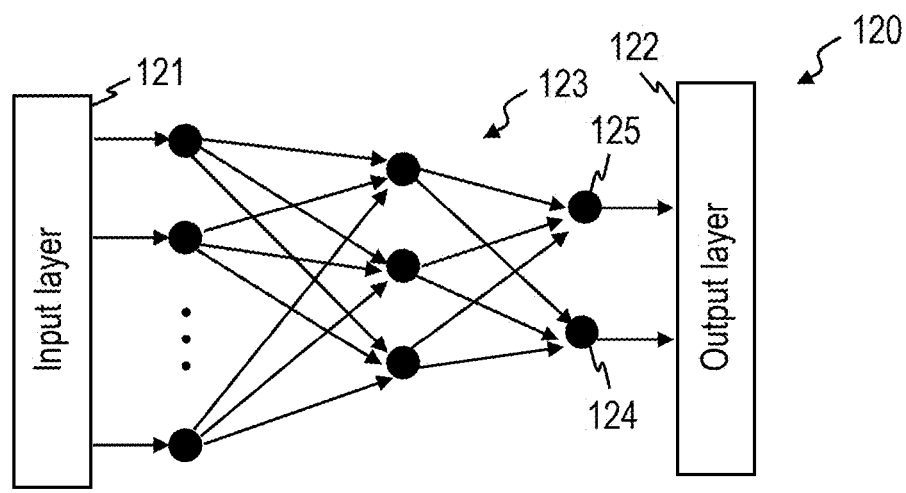
FIG. 11 is a schematic representation of a machine learning (ML) model that may be used by the methods and vehicle processing systems.

FIG. 11 illustrates a ML model 120 that may be used to determine the impact of an identified situation on the confidence in the map data for taking decisions and the confidence in the vehicle sensor data for taking the decisions. The ML model 120 comprises an input layer 121 operative to receive, e.g., information on the identified situation and the type of data (e.g., the type of vehicle sensor from which the vehicle sensor data come). The ML model comprises one or several hidden layers 123. Outputs 124, 125 may provide the FN rate and FP rate expected for the type of data and the respective situation. The outputs 124, 125 may be provided via an output layer 122 (which may perform optional post-processing) to quantify the impact of the specified situation on the confidence in the specified data for taking the decisions.

The BN 110 may be parameterized and/or the ML model 120 may be trained based on data aggregated from a plurality of vehicles in a plurality of situations. Supervised learning techniques may be used to determine parameter values of the BN 110 and/or to determine parameter values (such as biases, weights, etc.) of the ML model 120. Techniques such as gradient descent known to the skilled person may be used to set up the BN 110 and/or the ML model 120.

While the generation of the BN 110 and/or the ML model 120 is typically performed remotely from the vehicle 10, the BN 110 and/or the ML model 120 is provided to the vehicle processing system 20. The vehicle processing system 20 may use the BN 110 and/or the ML model 120 to perform the causality analysis, for example, during runtime operation of the at least one processing circuit 30.

Figure 12:
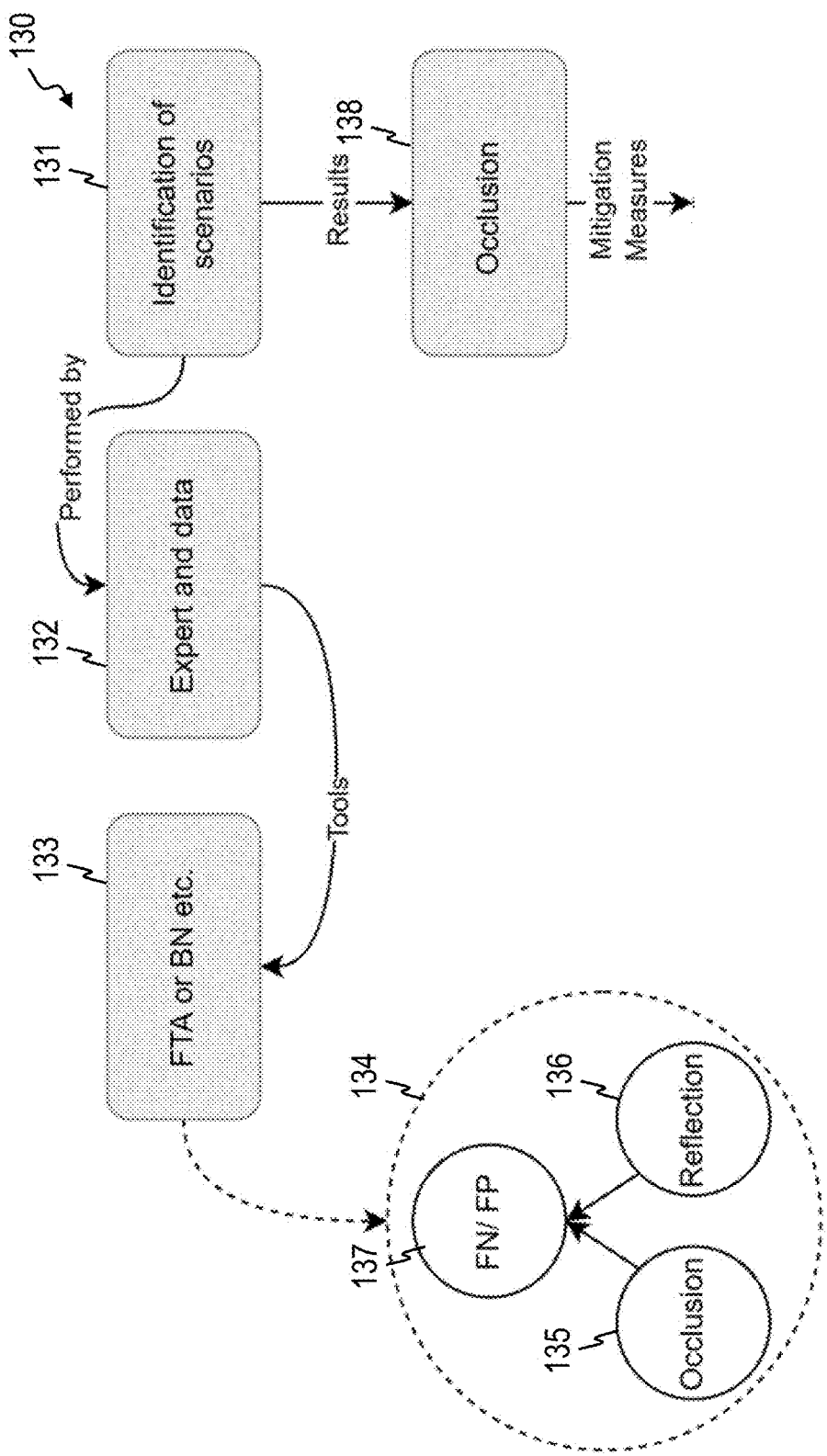
FIG. 12 is a diagram illustrating identification of an occlusion scenario.
Figure 13:
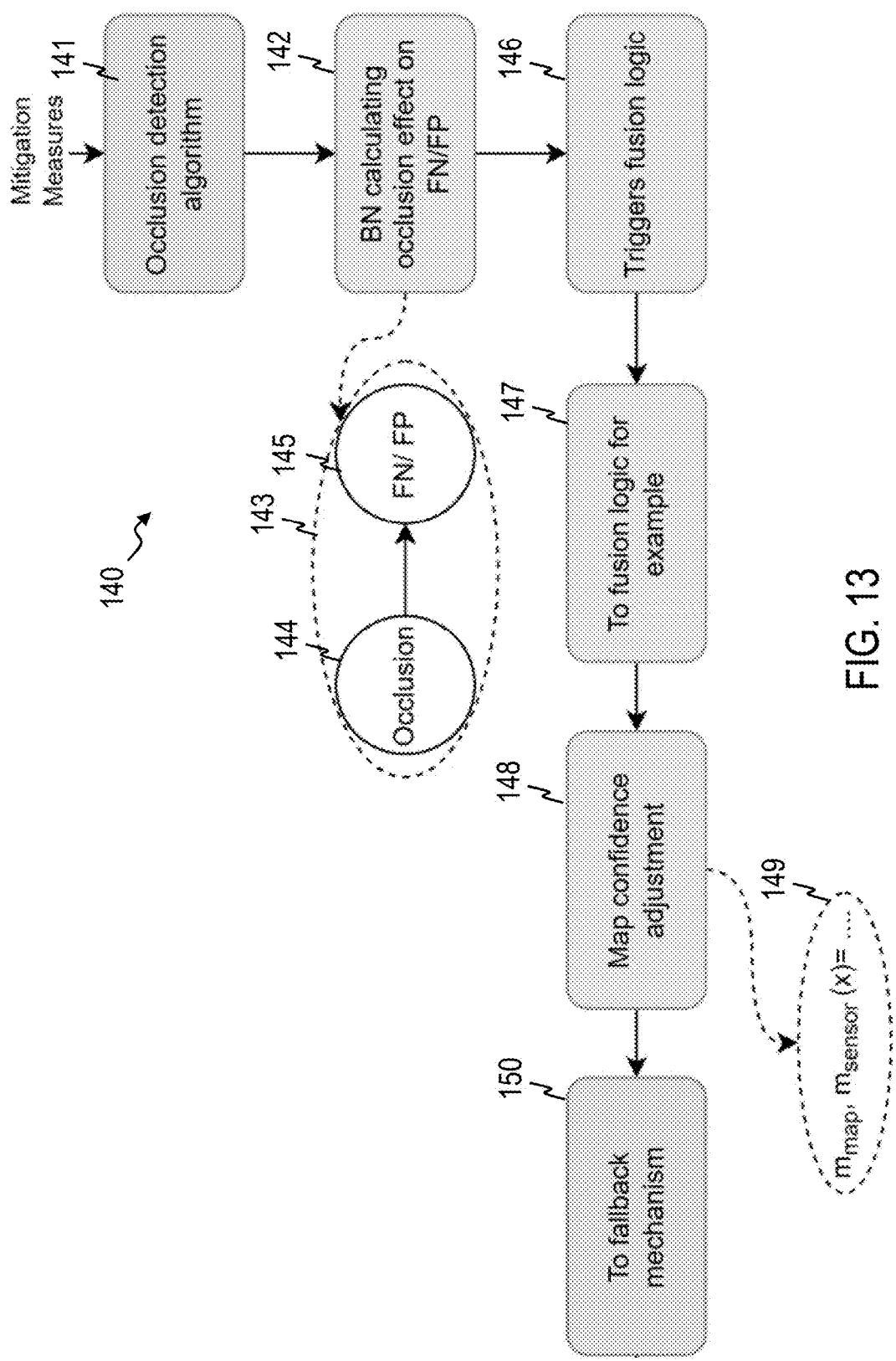
FIG. 13 is a diagram illustrating operation of the method and vehicle processing system in response to detection of the occlusion scenario.

FIG. 12 and FIG. 13 are diagrams illustrating operation of the methods and systems according to embodiments for ensuring SOTIF in presence of an occlusion. FIG. 12 illustrates operations performed remotely from the vehicle processing system 20 (e.g., by one or several computing resources in the cloud or otherwise remote from the vehicle 10). FIG. 13 illustrates operations performed by the vehicle processing system 20 during runtime operation.

Referring to FIG. 12, one or several computing resources may perform an identification of scenarios 131. Thereby, a set of scenarios may be determined which are pre-defined when the vehicle processing system 20 performs its runtime processing. The identification of scenarios 131 may be based on data 132 aggregated from a plurality of vehicles and, optionally, expert knowledge (e.g., when using supervised learning). A model (such as an FTA or BN) 133 that is operative to quantify the impact of the respective scenario on the FP and/or FN rates of decisions taken is set up. The model 133 is operative to provide the FP and/or FN rates 137 for various scenarios 135, 136 such as occlusions and reflections 136.

The results of the scenario identifications comprise an occlusion scenario 138. The occlusion scenario 138 and possible mitigation measures that include an adjustment of confidence value(s) for at least one function may be provided to the vehicle processing system 20 for use. This may be done during field use of the vehicle 10, e.g., via a vehicle communication interface that is communicatively interfaces with the one or several computing resources. Alternatively, the scenario(s) and associated mitigation measures may be stored in the vehicle processing system 20 upon manufacture of the vehicle.

Referring to FIG. 13, the vehicle processing system 20 is operative to perform an occlusion detection algorithm 141. This may be done in various conventional ways, e.g., by performing image segmentation, comparison of image data with map data that includes traffic sign information, and/or by using weather data indicating reduced vision.

The vehicle processing system 20 is operative to perform a causality analysis that quantifies the impact of the detected occlusion on the confidence in decision taken based on the vehicle sensor data and on the confidence in decision taken based on the map data. The vehicle processing system 20 may use the BN 143 associated with the occlusion scenario to determine the FN and/or FP rates 145 caused by the detected occlusion 144.

The vehicle processing system 20 may be operative to trigger 146 the fusion logic. The process may process to the fusion logic 147. At 148, the vehicle processing system 20 may be operative to adjust confidence value(s) that are based on the impact of the scenario on the decisions based on the vehicle sensor data on the decision taken based on the map data, as used in the fusion. The adjustment may comprise an adjustment of probability masses 149. A function may be performed based on the fusion. The adjustment of the confidence value(s) is implemented so as to increase a relative impact of the map data as compared to the vehicle sensor data, to give the map data greater weight than in the absence of the occlusion scenario.

The vehicle processing system 20 may optionally be operative to perform a fallback mechanism 150 if the fusion does not result in SOTIF. The fallback mechanism may comprise causing a substitute function to be performed.

Figure 14:
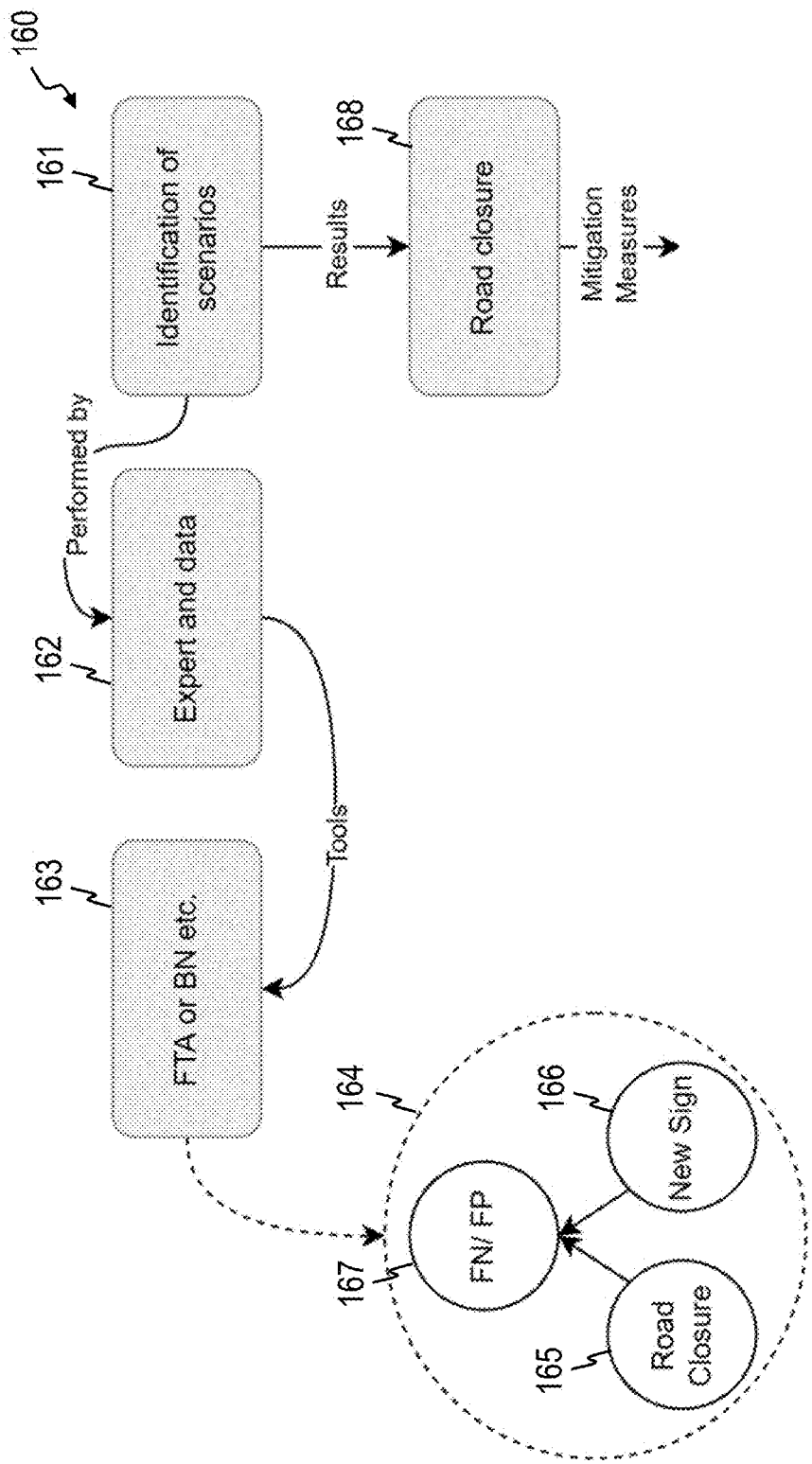
FIG. 14 is a diagram illustrating identification of a road closure scenario.
Figure 15:
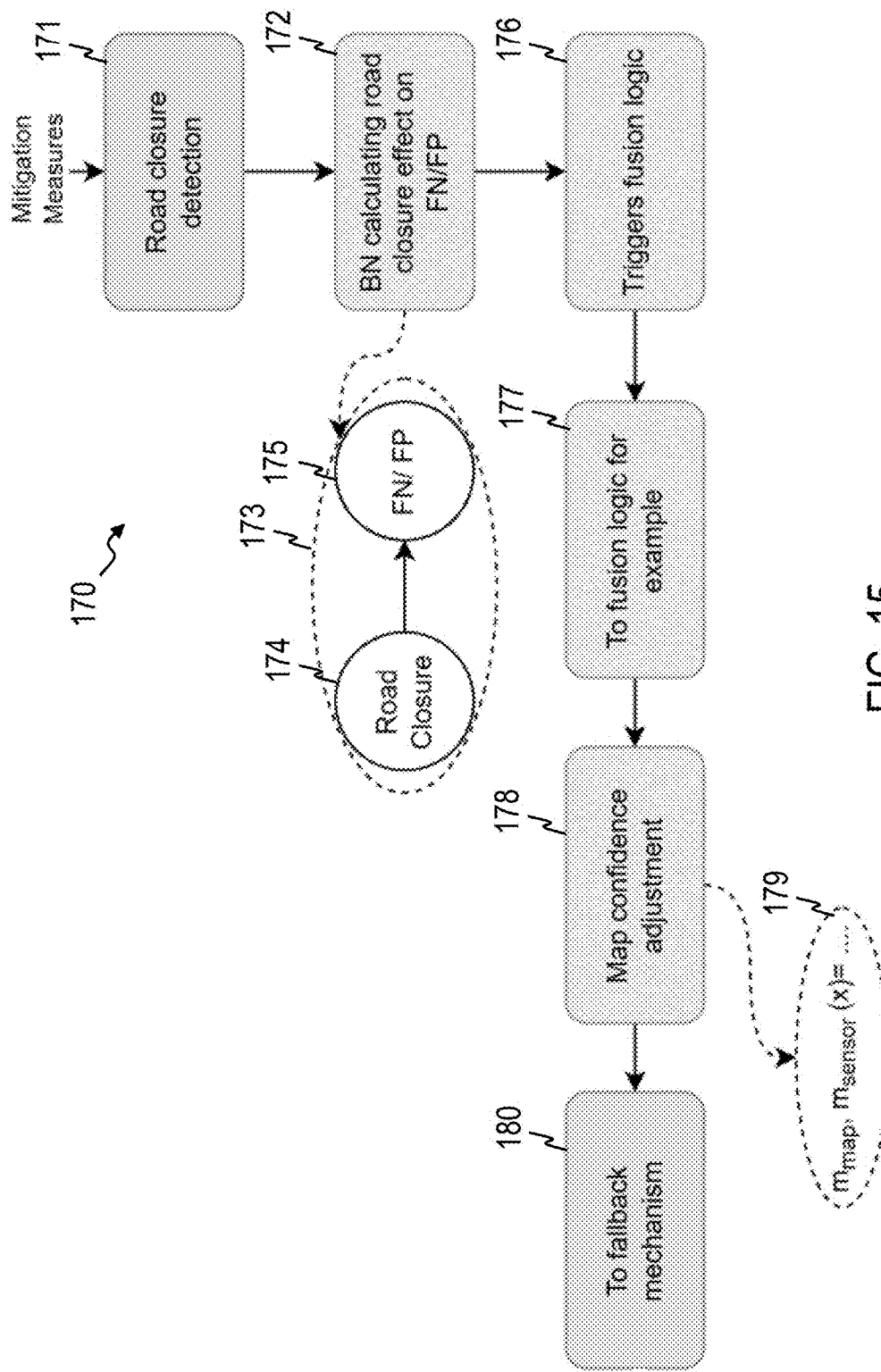
FIG. 15 is a diagram illustrating operation of the method and vehicle processing system in response to detection of the road closure scenario.

FIG. 14 and FIG. 15 are diagrams illustrating operation of the methods and systems according to embodiments for ensuring SOTIF in presence of a road closure, which affects the confidence in the map data (and optionally, but not necessarily, also in some sensor data). FIG. 14 illustrates operations performed remotely from the vehicle processing system 20 (e.g., by the one or several computing resources in the cloud or otherwise remote from the vehicle 10). FIG. 15 illustrates operations performed by the vehicle processing system 20 during runtime operation.

The blocks in FIGS. 14 and 15 are designated by reference signs incremented by thirty as compared to FIG. 12 and FIG. 13. The following description will focus on the differences as compared to the description of FIGS. 12 and 13.

Referring to FIG. 14, the one or several computing resources identify scenarios including a road closure scenario 168. A model 163 is trained or parameterized, which provides the FN/FP rates for various scenarios that affect the confidence in the map data. These various scenarios may include the road closure 165 and presence of a new sign 166. A BN implementation 164 may be used.

The road closure scenario 168 and mitigating measures (such as adjustments in confidence value(s)) are provided to the vehicle processing system 20.

FIG. 15 illustrates processing for the road closure scenario. At 171, a road closure detection is performed. The road closure detection may be performed based on, e.g., image data in combination with image processing and/or traffic information data and/or V2V communications received from one or several leading vehicles. The remaining processing is similar to that of FIG. 13. At 178, 179, the vehicle processing system 20 may be operative to adjust confidence value(s) that are based on the impact of the scenario. The adjustment of the confidence value(s) is implemented so as to decrease a relative impact of the map data as compared to the vehicle sensor data, to give the map data lesser weight than in the absence of the road closure scenario.

Figure 16:
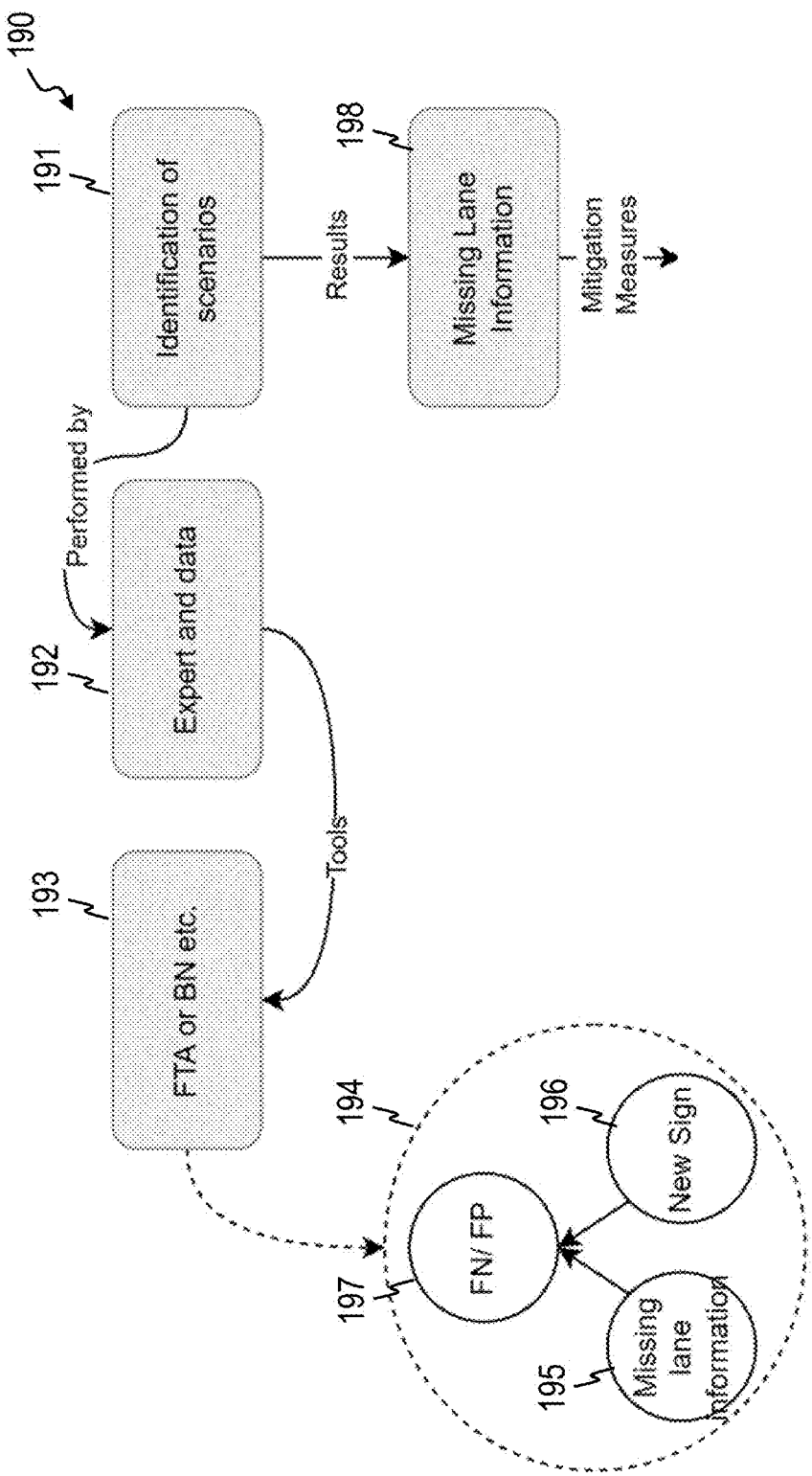
FIG. 16 is a diagram illustrating identification of a missing lane information scenario.
Figure 17:
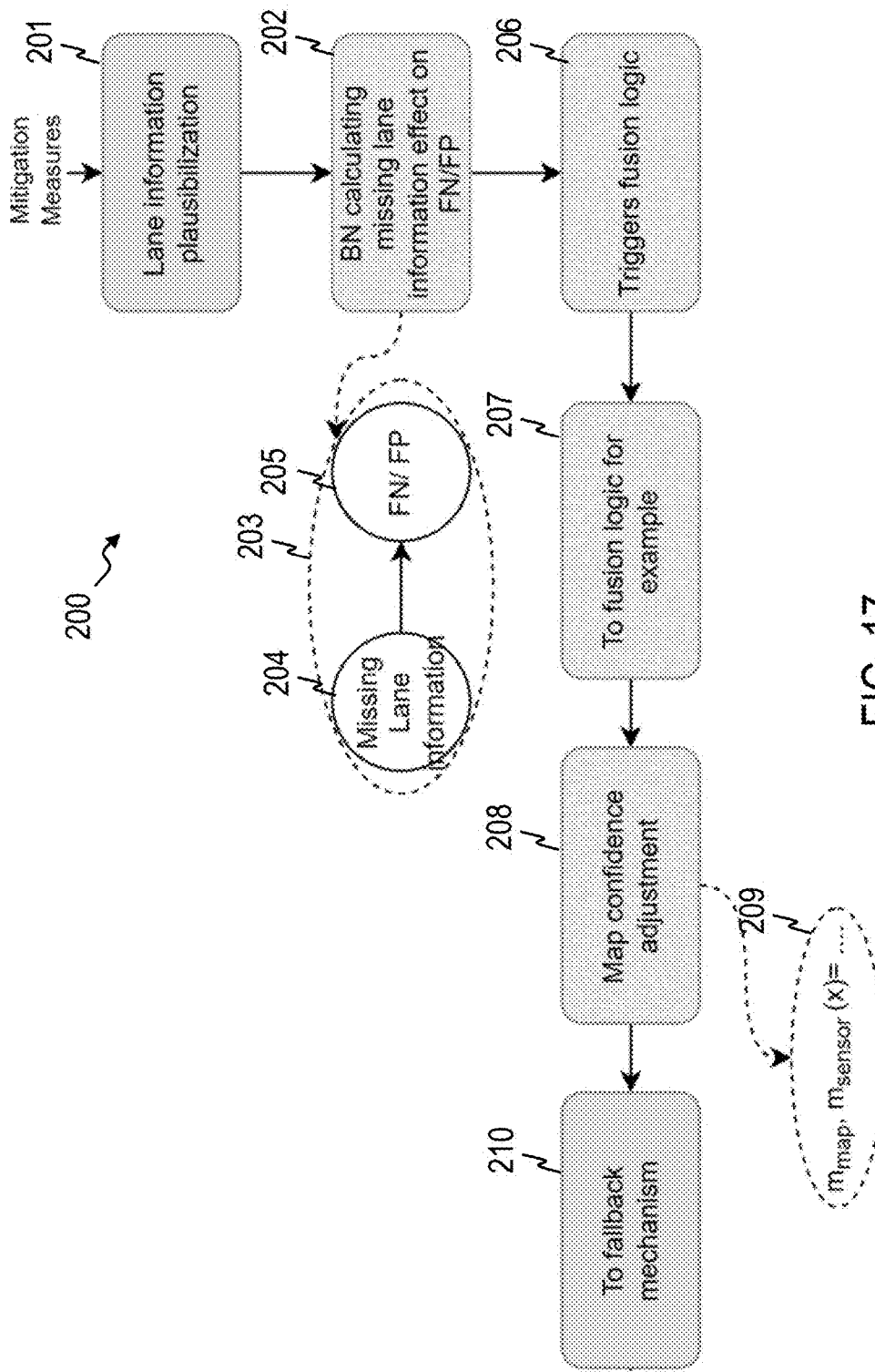
FIG. 17 is a diagram illustrating operation of the method and vehicle processing system in response to detection of the missing lane information scenario.

FIG. 16 and FIG. 17 are diagrams illustrating operation of the methods and systems according to embodiments for ensuring SOTIF if lane information is missing in map data, which affects the confidence in the map data. FIG. 16 illustrates operations performed remotely from the vehicle processing system 20 (e.g., by the one or several computing resources in the cloud or otherwise remote from the vehicle 10). FIG. 17 illustrates operations performed by the vehicle processing system 20 during runtime operation.

The blocks in FIGS. 16 and 17 are designated by reference signs incremented by sixty as compared to FIG. 12 and FIG. 13. The following description will focus on the differences as compared to the description of FIGS. 12 and 13.

Referring to FIG. 16, the one or several computing resources identify scenarios including a missing lane information scenario 198. A model 193 is trained or parameterized, which provides the FN/FP rates for various scenarios that affect the confidence in the map data. These various scenarios may include the missing lane information 165 and presence of a new sign 166. A BN 194 may be used.

The missing lane information scenario 198 and mitigating measures (such as adjustments in confidence value(s)) are provided to the vehicle processing system 20.

FIG. 17 illustrates processing for the missing lane information scenario. The missing lane information scenario may be detected directly from the map data. At 201, a missing lane information detection is performed. The missing lane information detection may be performed based on the map data. The remaining processing is similar to that of FIG. 13. At 208, 209, the vehicle processing system 20 may be operative to adjust confidence value(s) that are based on the impact of the scenario. The adjustment of the confidence value(s) is implemented so as to decrease a relative impact of the map data as compared to the vehicle sensor data, to give the map data lesser weight than in the absence of the missing lane information scenario.

As a further specific example, reference is made to a scenario in which the vehicle enters a tunnel. The tunnel makes it more challenging for sensor-based positioning to be carried out, as landmarks cannot be identified as easily as in an environment in which a continuous change in vehicle position can be ascertained relative to landmarks. It is assumed that the availability of map data is not an issue, as map data, even when provided during field operation via a cellular network, is normally provided sufficiently in advance that map data is available while the tunnel is being traversed. In case of entering a tunnel, the following processing is performed onboard the vehicle:

Situation analysis (trigger condition): Entering the tunnel can be detected automatically based on map data indicating the start and end of a tunnel. Entering the tunnel can also be detected based on sensor data. For illustration, loss of a GNSS signal and/or processing of camera images and/or LiDAR data can be used to detect the tunnel scenario.

Causality analysis (performance limitations): The tunnel causes confidence in a camera-based localization scheme to be reduced. This decrease in confidence, as caused by the tunnel scenario, can be quantitatively assessed using a Bayesian network (BN). The BN may determine, based on a certainty of the tunnel scenario being present, how strongly the present situation affects a map localization performance and/or a world model. Confidence in other sensor data, such as LiDAR data, is not reduced by the tunnel scenario.

Ensuring SOTIF: Functions performed based on sensor data such as LiDAR data, for which confidence is not reduced, may be performed in their usual manner. Fallback mechanisms may be activated for functions that would otherwise rely on camera-based localization and/or map-based localization.

Operation of methods and vehicle processing systems for this scenario is described in more detail with reference to FIG. 18, FIG. 19, and FIG. 20.

Figure 18:
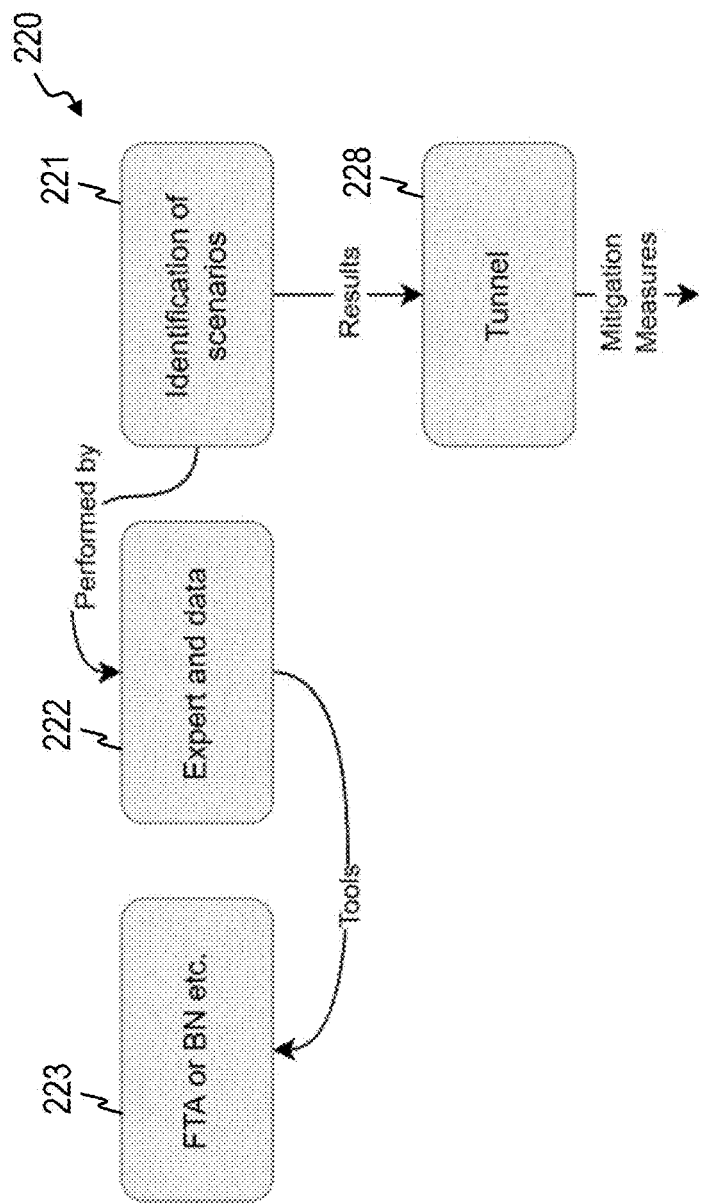
FIG. 18 is a diagram illustrating identification of a tunnel information scenario.
Figure 19:
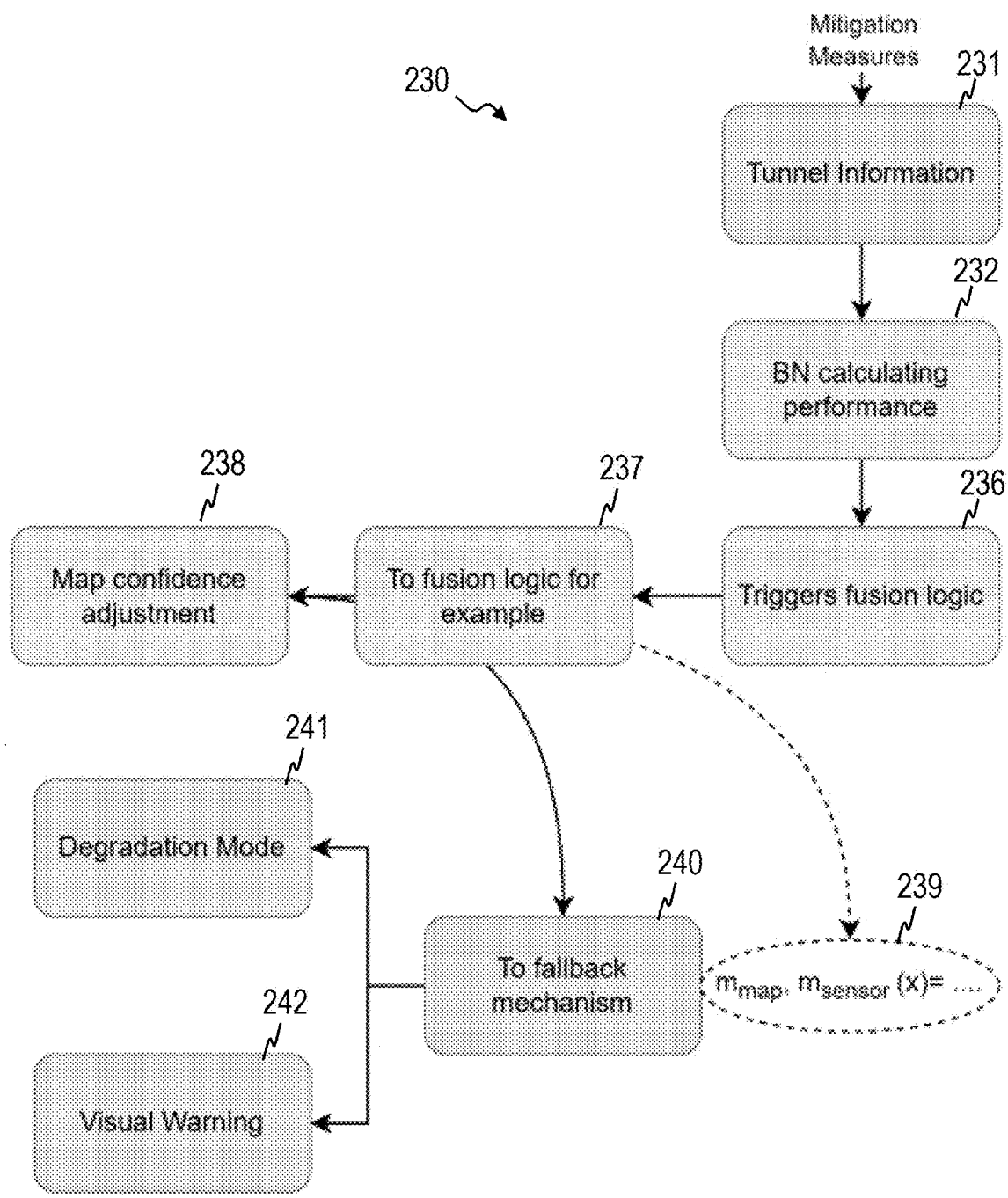
FIG. 19 is a diagram illustrating operation of the method and vehicle processing system in response to detection of the tunnel scenario.

FIG. 18 and FIG. 19 are diagrams illustrating operation of the methods and systems according to embodiments for ensuring SOTIF in presence of a tunnel. FIG. 18 illustrates operations performed remotely from the vehicle processing system 20 (e.g., by the one or several computing resources in the cloud or otherwise remote from the vehicle 10). FIG. 19 illustrates operations performed by the vehicle processing system 20 during runtime operation. FIG. 20 is a diagram illustrating techniques of quantitatively assessing causality of the tunnel scenario for a change in confidence in map data and/or sensor data. More specifically, FIG. 20 shows a first Bayesian Network analysis 250 that may be trained or parameterized remotely from the vehicle and a second Bayesian Network analysis 260 performed during runtime operation.

The blocks in FIGS. 18 and 19 are designated by reference signs incremented by ninety as compared to FIG. 12 and FIG. 13. The following description will focus on the differences as compared to the description of FIGS. 12 and 13.

Figure 20:
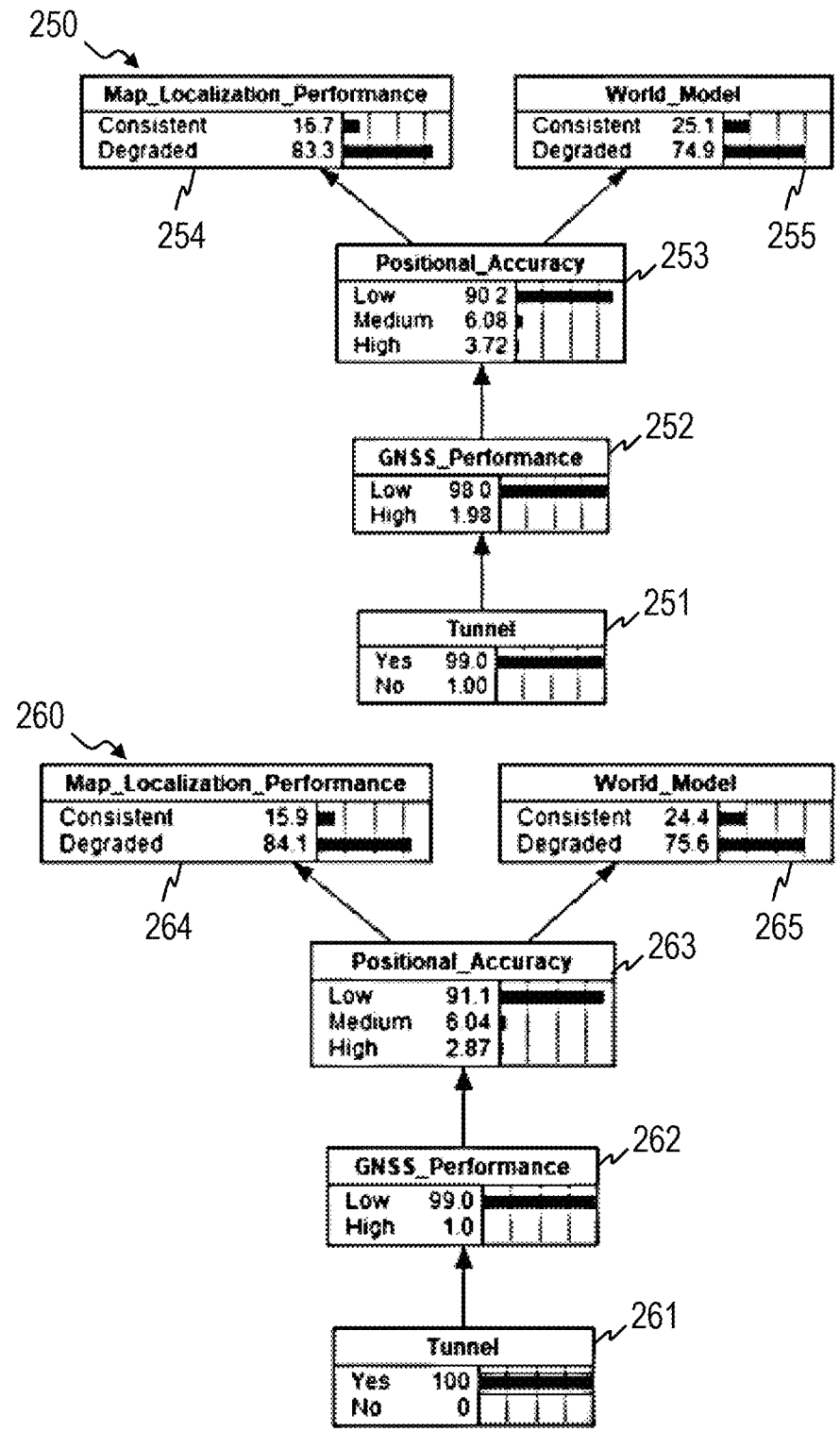
FIG. 20 is a diagram illustrating techniques of quantitatively assessing causality of the tunnel scenario for a change in confidence in map data and/or sensor data.

Referring to FIG. 18 and FIG. 20, the one or several computing resources identify scenarios including a tunnel scenario 228. A BN 250 (FIG. 20) is trained or parameterized, which provides the FN/FP rates for quantifying the effect of the tunnel scenario on, e.g., map localization performance 254 and a world model 255. The BN analysis may include a quantification of GNSS performance 252 in the tunnel scenario and its resultant effect on positional accuracy 253.

The tunnel scenario 228 and mitigating measures (such as adjustments in confidence value(s)) are provided to the vehicle processing system 20.

FIG. 19 illustrates processing for the tunnel information scenario. The tunnel information scenario may be detected from the map data or from the sensor data, as explained above. At 231, a tunnel information detection is performed. The remaining processing is similar to that of FIG. 13. At 238, 239, the vehicle processing system 20 may be operative to adjust confidence value(s) that are based on the impact of the scenario. The adjustment of the confidence value(s) is implemented so as to decrease a relative impact of the map data as compared to the vehicle sensor data, to give the map data lesser weight than in the absence of the tunnel information scenario.

The causality analysis at 232 may use a BN analysis 260 (FIG. 20). Parameters of the BN 250 determine how the detected scenario 261 affects GNSS performance 262, positional accuracy 263 and, ultimately, map localization performance 264 and a world map 265. These parameters may correspond to the parameters of the BN 250 that is learned or trained offboard the vehicle, using large amounts of data and optionally expert knowledge.

Reverting to FIG. 19, the situation analysis (tunnel scenario) and causality analysis (tunnel leads to degradation in both map localization performance and world model) may cause the fallback mechanism 240 to be invoked. The fallback mechanism 240 may comprise a degradation mode 241 in which automatic control functions may still be performed, but to a lesser extent. The fallback mechanism 240 may comprise control of a HMI to output a visual, audible, and/or tactile warning 242.

FIG. 20 is a diagram that illustrates the BN 250 as trained or parameterized remotely from the vehicle by computing resource(s). The computing resource(s) may determine all parameters, in particular the probability tables that determine how true (T) and false (F) probabilities propagate in the BN, using data aggregated from a plurality of vehicles, optionally also using expert knowledge. The skilled person is aware of techniques of determining, based on data, the parameters of a BN. In the present case, the BN is applied to determine how a scenario (tunnel scenario) affects confidence in a positioning sensor (such as a GNSS receiver) and, thus, in positional accuracy, map localization performance that uses the positioning sensor, and a world model that uses sensors other than the GNSS receiver, such as a camera or set of cameras.

The BN 250 includes a node 251 including true (T) and false (F) values for a tunnel scenario. The fact that there is a small probability of, e.g., 1% (or another small value) for the tunnel scenario being false reflects that some of the data used for parameterizing the BN may not actually be tunnels, even when identified as tunnels based on expert labels or automatically.

The fact that it is highly likely at node 251 that the tunnel scenario is present gives rise to GNSS performance being very likely to be low and unlikely to be high, as illustrated at node 252. The probabilities for the GNSS performance being low or high are obtained by propagating the T and F values from node 251 to GNSS performance node 252 of the BN graph. The high probability for low GNSS performance reflects a loss of signal frequently encountered in tunnels.

The probability distribution for GNSS performance (node 252) is propagated to a positional accuracy probability distribution at node 253. The positional accuracy probability distribution at node 253 may be a probability distribution for two or more than two positional accuracies. For illustration, the probability distribution may be classified as being low, medium, and high. The high probability for low GNSS performance (node 252) causes the probability distribution at node 253 to peak at low positional accuracy, with the probability for medium positional accuracy being lower and the probability for high positional accuracy being lowest.

The positional accuracy probability distribution at node 253 is propagated to a map localization performance at node 254. The increased probability of low positional accuracy (node 253) affects the probability of the map localization performance to be consistent. The probability distribution for map localization performance peaks at degraded map localization performance. This reflects that loss of GNSS signal in a tunnel scenario reduces confidence in the map localization performance.

The positional accuracy probability distribution at node 253 is propagated to a world model performance at node 255. The increased probability of low positional accuracy (node 253) affects the probability of the world model to be consistent. However, the likelihood of the tunnel scenario being causally related to a degradation in world model is less pronounced than for the degradation in localization performance. Still, the probability distribution for the world model peaks at degraded world model, but there is a higher probability for the world model to remain consistent than for the localization performance. This reflects that loss of GNSS signal in a tunnel scenario reduces confidence in the world model but that a reduced confidence in the world model is less likely to be causally related to the tunnel scenario than a reduced confidence in the localization performance.

As mentioned above, the way in which probabilities are propagated in the BN graph of the BN 250 is trained or learned remotely from the vehicle, using a computing resource. Measurements provided by the vehicle(s) using the BN 250 as previously parameterized may be used to update the BN 250. Updates of the BN 250 may be provided to vehicle(s) on the fly for further use.

FIG. 20 also shows a BN 260, which results from the use of the parameterized BN 250. The BN 260 is used onboard a vehicle to perform a causality analysis, to determine whether a degradation in map localization performance and/or world model is causally related to the detected tunnel scenario.

The BN 260 includes a node 261 including true (T) and false (F) values for a tunnel scenario. The tunnel scenario is identified with certainty onboard the vehicle, using conventional techniques (such as traffic signs in map data). The BN 260 is applied to determine how the certainty of the vehicle being in a tunnel scenario (node 261) affects a probability distribution of GNSS performance (node 262), positional accuracy (node 263), map localization performance (node 264) and world model (node 265). The probabilities are propagated through the directed graph of the BN 260. The fact that the T and F values for the tunnel scenario detected onboard the vehicle (node 261) differ from those in the BN 250 causes the probability distributions for the downstream nodes 262-265 to be shifted such that the probability for good performance is reduced. This confirms the causality between the identified tunnel scenario and the reduced confidence in the world model (node 265) and, to an even greater extent, in the map localization performance (node 264).

Figure 21:
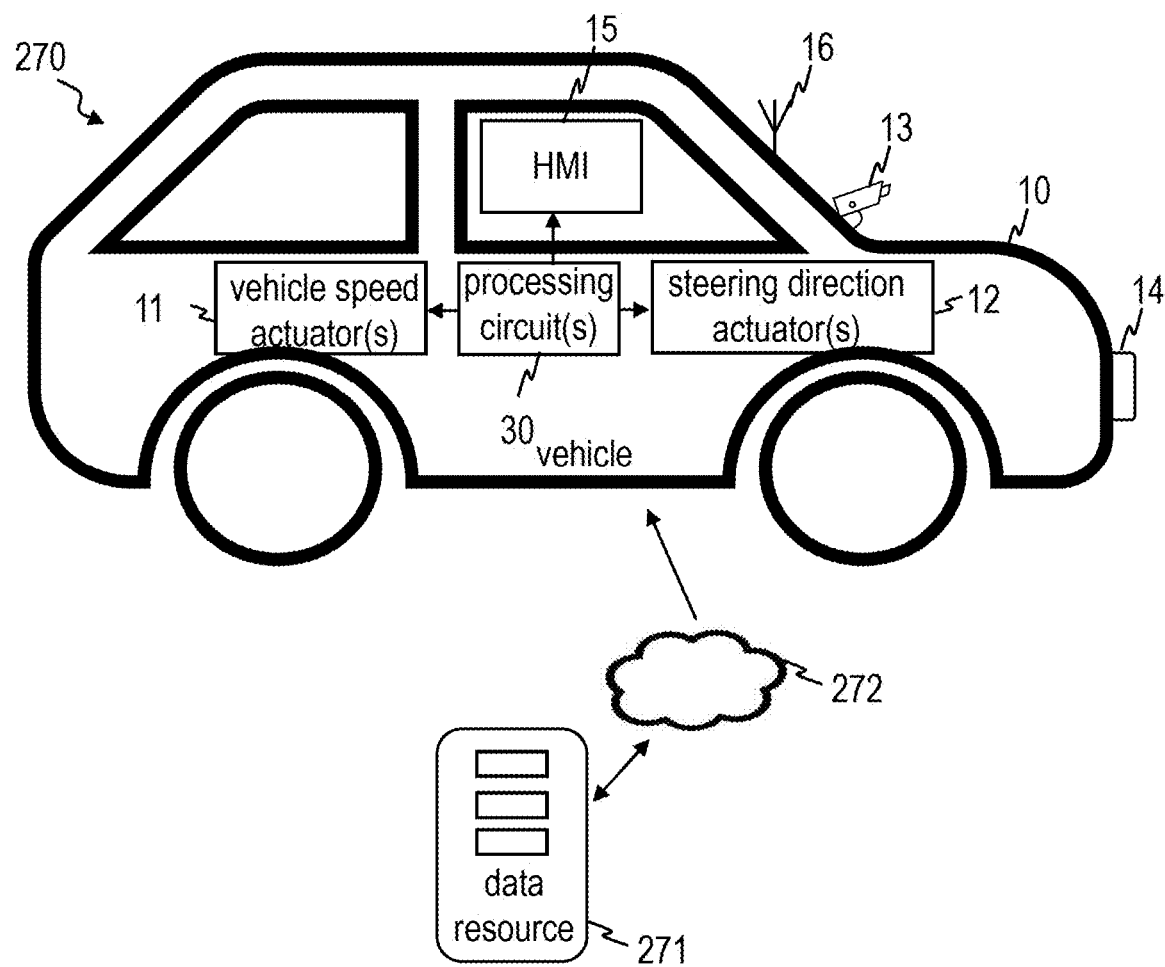
FIG. 21 is a diagram of a system comprising a vehicle that comprises the vehicle processing system.

FIG. 21 is a diagram of a system 270 according to an embodiment. The system 270 comprises the vehicle 10 comprising the vehicle processing system 20. The vehicle 10 may comprise a vehicle communication interface 16 for wireless transmission and/or reception of data communications. The vehicle 10 may be operative to access one or several data resources 271 via a wide area network (WAN) 272 communicatively coupled to a cellular communication network. The vehicle processing system 20 may be operative to retrieve information from the data resource(s) 271 to perform the situation analysis. Alternatively, or additionally, the vehicle processing system 20 may be operative to provide data acquired during runtime operation of the vehicle processing system 20. Such data may be used to further improve the situation analysis and/or causality analysis and/or mitigation measures to be performed by other vehicles having a vehicle processing system constructed and operative as disclosed herein.

Figure 22:
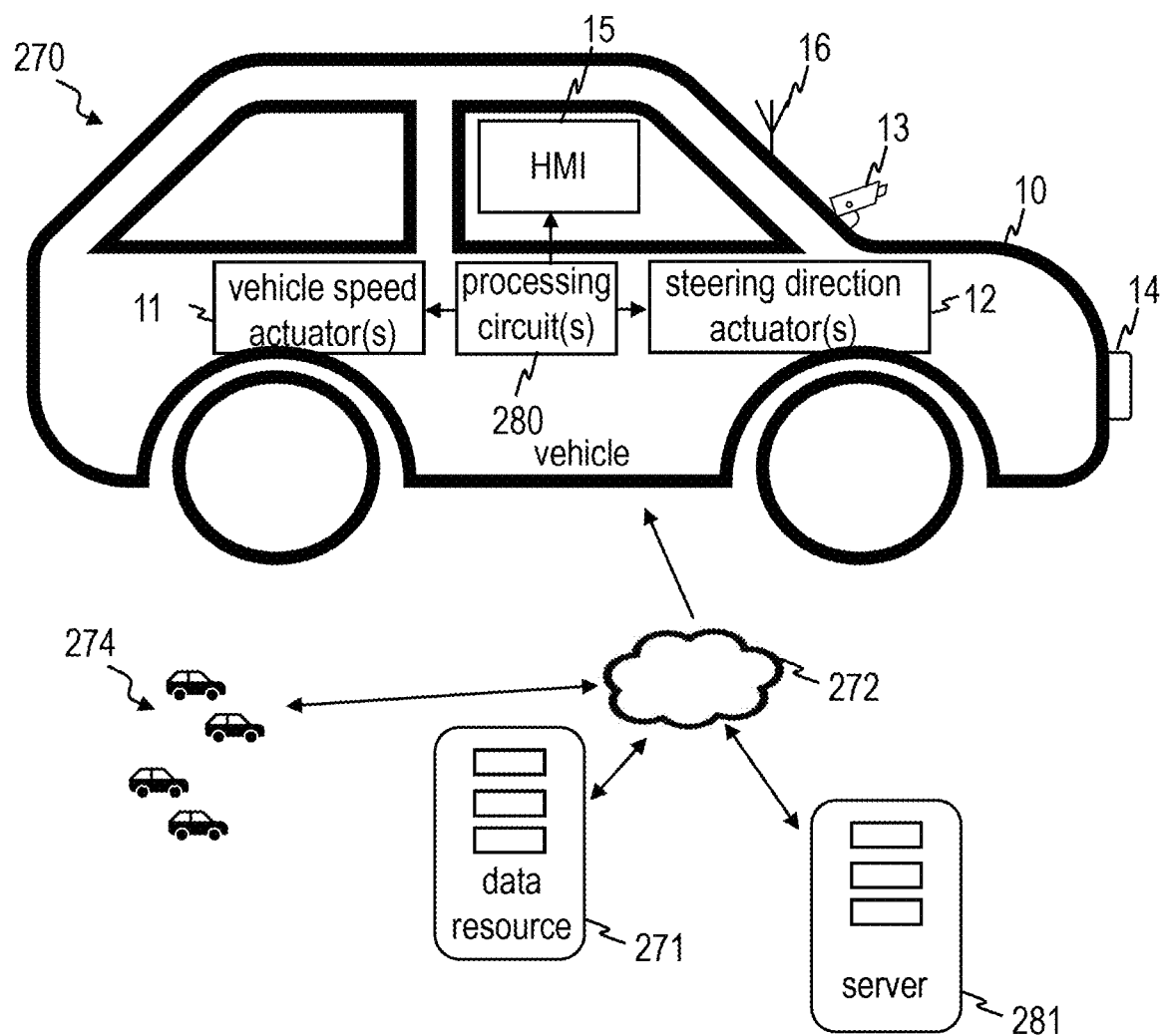
FIG. 22 is a diagram of another system comprising a processing system operative to perform the method according to an embodiment.

FIG. 22 is a diagram of a system 270 according to another embodiment. In the system 270, the operation of the at least one processing circuit 30 may be distributed between a vehicle processing circuit 280 and a remote processing circuit of at least one server 281. Some of the functions of the at least one processing circuit 30 may be performed by the at least one server 281, such as functions to ensure the SOTIF.

The system 270 also comprises a plurality of vehicles 274. The at least one server 281 may aggregate data from the plurality of vehicles 274 and from the vehicle 20 to improve the situation analysis and/or causality analysis and/or mitigation measures during field operation. Updated models (such as updated BN or ML models) may be provided to the vehicle 10 by the at least one server 281 during field operation of the vehicle 10. Thereby, the quality of the decision-making by the vehicle(s) 10, 274 is improved during field operation.

As schematically illustrated in FIGS. 18 and 19, the vehicle 10 according to any embodiment disclosed herein may comprise an HMI 15. The HMI 15 may comprise an optical output device (such as a display or projector), an audio output device (such as an electroacoustic transducer), and/or a tactile output device (such as a device that provides tactile feedback). The HMI 15 is particularly useful to perform a fallback function when the detected situation is such that an actuator control operation is not guaranteed to comply with SOTIF.

The techniques disclosed herein provided various technical effects. By using the map data, in combination with the vehicle sensor data, the map data can assist perception functions and provide confidence on detected features. By controlling the at least one confidence value based on the detected situation, the manner in which the map data and the vehicle sensor data are combined to determine the at least one function is adjusted in dependence on whether the detected situation has the effect of causing a degradation in confidence in the map data, the vehicle sensor data, or both. Adjusting the relative impact of the vehicle sensor data and the map data when determining the at least one function, thereby contributing to SOTIF.

While embodiments have been described with reference to the drawings, modifications and alterations may be implemented in other embodiments. While exemplary use cases in which the methods and vehicle processing system can be applied have been described in detail, the techniques disclosed herein may be used in association with a variety of additional scenarios. For further illustration, while exemplary sensors have been described, the techniques disclosed herein are generally applicable to a wide variety of vehicle sensors operative to capture data related to an environment of the vehicle.

For further illustration, while embodiments have been described in which a causality of the detected situation and a reduction in confidence in the map data and/or a reduction in confidence in the vehicle sensor data is determined using a BN, FTA, or ML model, other techniques such as multi-dimensional fits obtained from the data aggregated from a plurality of vehicles 224 may be used to quantify the change in FN and/or FP rates. Further, it is not required to determine the change in FN and/or FP rates. Other quantitative measures indicative of a belief function may be used.

For still further illustration, while the vehicle sensor data may be captured by vehicle sensors fixedly installed in the vehicle, in other embodiments at least part of the vehicle sensor data may be captured using sensor(s) installed in a device that is arranged in or on the vehicle in a reversibly removable manner and that is interfaced with the vehicle processing circuit.

For still further illustration, the situation analysis disclosed herein may comprise probabilistic techniques of detecting situations. In this case, probabilities of a certain situation to be present (true) or absent (false) may be determined. Bayesian network techniques similar to those disclosed with reference to FIG. 20 or other probabilistic techniques may be used to determine a probability distribution that quantifies the probabilities of a situation or scenario to be present or absent. The reduction in confidence may be determined using probability distribution propagation through a BN graph or other probabilistic techniques. For illustration, techniques similar to those explained with reference to FIG. 20 may be used.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative and not restrictive. Various mechanical, compositional, structural, electrical, and operational changes may be made without departing from the spirit and scope of this description and the claims. In some instances, well-known circuits, structures, and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figures individually although they may not have been described in the afore or following description. Also, single alternatives of the embodiments described in the Figures and the description and single alternatives of features thereof can be disclaimed from the subject matter of the invention or from disclosed subject matter. The disclosure comprises subject matter consisting of the features defined in the claims or the embodiments as well as subject matter comprising said features.

The term "comprising" does not exclude other elements or process blocks, and the indefinite article "a" or "an" does not exclude a plurality. A single unit or process block may fulfil the functions of several features recited in the claims. The mere fact that certain measures are recited in mutually different dependent claims does not indicate that a combination of these measures cannot be used to our advantage. Components described as coupled or connected may be electrically or mechanically directly coupled, or they may be indirectly coupled via one or more intermediate components. Any reference signs in the claims should not be construed as limiting the scope.

A machine-readable instruction code may be stored/distributed on a suitable medium, such as an optical storage medium or a solid-state medium supplied together with or as part of other hardware, but may also be distributed in other forms, such as via a wide area network or other wired or wireless telecommunication systems. Furthermore, a machine-readable instruction code can also be a data structure product or a signal for embodying a specific method such as the method according to embodiments.

What is claimed is:

1. A method of controlling vehicle functions, the method comprising:
   retrieving, by at least one processing circuit, vehicle sensor data and map data;
   determining, by the at least one processing circuit, at least one function that is to be performed, the at least one function comprising an autonomous driving function or a driver assistance function, wherein the autonomous driving function or the driver assistance function includes controlling at least one actuator of the vehicle by the at least one processing circuit; and
   causing, by the at least one processing circuit, execution of the at least one function;
   wherein determining the at least one function includes performing a fusion of the vehicle sensor data and the map data,
   wherein the fusion is performed based on at least one confidence value for at least one of the vehicle sensor data and the map data,
   wherein the at least one confidence value determines a relative impact of the vehicle sensor data and the map data in performing the fusion,
   wherein the method includes ensuring a Safety of the Intended Functionality, SOTIF, wherein ensuring the SOTIF comprises:
     performing, by the at least one processing circuit, a situation analysis to detect a situation that has a potential to impact safety of the vehicle, and
     adjusting, by the at least one processing circuit, the at least one confidence value based at least on the situation analysis,
   wherein insuring the SOTIF further comprises performing, by the at least one processing circuit, a causality analysis that quantifies a degradation in confidence in the vehicle sensor data and/or the map data, wherein the at least one confidence value is adjusted based on both the situation analysis and the causality analysis.

2. The method of claim 1, wherein the situation analysis is performed based at least on the vehicle sensor data and/or the map data.

3. The method of claim 2, further comprising retrieving, by the at least one processing circuit, information over a wide area network, wherein the retrieved information is related to at least one of a vehicle location and a vehicle operation state, wherein the situation analysis is performed based at least on the retrieved information.

4. The method of claim 2, wherein ensuring the SOTIF further comprises performing, by the at least one processing circuit, a causality analysis that quantifies a degradation in confidence in the vehicle sensor data and/or the map data, wherein the at least one confidence value is adjusted based on both the situation analysis and the causality analysis.

5. The method of claim 2, wherein performing the situation analysis comprises:
   determining a positional accuracy, and/or
   selecting the situation from a set of pre-defined situations.

6. The method of claim 5, wherein performing the situation analysis comprises providing, by the at least one processing circuit, update information for updating the set of pre-defined situations.

7. The method of claim 1, further comprising retrieving, by the at least one processing circuit, information over a wide area network, wherein the retrieved information is related to at least one of a vehicle location and a vehicle operation state, wherein the situation analysis is performed based at least on the retrieved information.

8. The method of claim 7, wherein the retrieved information comprises one, several, or all of: weather data, traffic data, road maintenance work data, information aggregated from a vehicle fleet.

9. The method of claim 1, wherein the causality analysis comprises determining, for the detected situation, a rate of false decisions taken based on the vehicle sensor data and/or the map data for the detected situation prior to adjustment of the at least one confidence value.

10. The method of claim 9, wherein the rate of false decisions is determined using at least one of a Bayesian network, a fault analysis tree, a machine learning model.

11. The method of claim 1, wherein performing the situation analysis comprises:
determining a positional accuracy, and/or
selecting the situation from a set of pre-defined situations.

12. The method of claim 11, wherein performing the situation analysis comprises providing, by the at least one processing circuit, update information for updating the set of pre-defined situations.

13. The method of claim 1, wherein the at least one function comprises an actuator operation function that causes operation of the at least one actuator and a fallback function, wherein determining the at least one function includes determining, based at least on the vehicle sensor data, the map data, and the adjusted at least one confidence value, which one of the actuator operation function and the fallback function is to be performed.

14. The method of claim 13,
wherein the actuator operation function comprises one or several of: a steering function, a braking function, an engine control function, and/or
wherein the fallback function includes one or several of: a substitute actuator operation function different from the actuator operation function, a human machine interface, HMI, control operation.

15. The method of claim 1, wherein the vehicle sensor data comprises one or several of: image data captured by a vehicle onboard camera, ranging data captured by a vehicle ranging sensor, location data.

16. The method of claim 1, wherein the at least one processing circuit comprises at least one vehicle onboard processing circuit that determines the at least one function and causes execution of the at least one function.

17. A vehicle processing system, comprising:
an interface operative to receive vehicle sensor data and map data; and
at least one processing circuit operative to
determine at least one function that is to be performed, the at least one function comprising an autonomous driving function or a driver assistance function, wherein the autonomous driving function or the drive assistance function includes controlling at least one actuator of the vehicle by the at least one processing circuit; and
cause execution of the at least one function;
wherein the at least one processing circuit is operative to perform a fusion of the vehicle sensor data and the map data, based on at least one confidence value for at least one of the vehicle sensor data and the map data, to determine the at least one function,
wherein the at least one confidence value determines a relative impact of the vehicle sensor data and the map data in performing the fusion, and
wherein the at least one processing circuit is operative to perform a process to ensure a Safety of the Intended Functionality, SOTIF, wherein the process to ensure the SOTIF includes:
performing a situation analysis to detect a situation that has a potential to impact safety of the vehicle, and
adjusting, by the at least one processing circuit, the at least one confidence value based at least on the situation analysis,
wherein ensuring the SOTIF further comprises performing, by the at least one processing circuit, a causality analysis that quantifies a degradation in confidence in the vehicle sensor data and/or the map data, wherein the at least one confidence value is adjusted based on both the situation analysis and the causality analysis.

18. The vehicle processing system of claim 17 operative to perform the method of:
retrieving, by at least one processing circuit, vehicle sensor data and map data;
determining, by the at least one processing circuit, at least one function that is to be performed; and
causing, by the at least one processing circuit, execution of the at least one function;
wherein determining the at least one function includes performing a fusion of the vehicle sensor data and the map data, wherein the fusion is performed based on at least one confidence value for at least one of the vehicle sensor data and the map data,
wherein the at least one confidence value determines a relative impact of the vehicle sensor data and the map data in performing the fusion, and
wherein the method includes ensuring a Safety of the Intended Functionality, SOTIF, wherein ensuring the SOTIF comprises:
performing, by the at least one processing circuit, a situation analysis to detect a situation that has a potential to impact safety of the vehicle, and
adjusting, by the at least one processing circuit, the at least one confidence value based at least on the situation analysis.

19. A vehicle, comprising:
at least one actuator; and
a vehicle processing system having:
an interface operative to receive vehicle sensor data and map data; and
at least one processing circuit operative to
determine at least one function that is to be performed; and
cause execution of the at least one function;
wherein the at least one processing circuit is operative to perform a fusion of the vehicle sensor data and the map data, based on at least one confidence value for at least one of the vehicle sensor data and the map data, to determine the at least one function,
wherein the at least one confidence value determines a relative impact of the vehicle sensor data and the map data in performing the fusion, and
wherein the at least one processing circuit is operative to perform a process to ensure a Safety of the Intended Functionality, SOTIF, wherein the process to ensure the SOTIF includes:
performing a situation analysis to detect a situation that has a potential to impact safety of the vehicle, and
adjusting, by the at least one processing circuit, the at least one confidence value based at least on the situation analysis, wherein ensuring the SOTIF further comprises performing, by the at least one processing circuit, a causality analysis that quantifies a degradation in confidence in the vehicle sensor data and/or the map data, wherein the at least one confidence value is adjusted based on both the situation analysis and the causality analysis, and wherein the vehicle processing system is operative to control the at least one actuator to cause execution of the at least one function.

20. A non-transitory computer readable medium comprising a computer program having machine-readable instructions which, when executed by at least one processing circuit, cause the at least one processing circuit to perform:

retrieving, by at least one processing circuit, vehicle sensor data and map data;

determining, by the at least one processing circuit, at least one function that is to be performed, the at least one function comprising an autonomous driving function or a driver assistance function, wherein the autonomous driving function or the driver assistance function includes controlling at least one actuator of the vehicle by the at least one processing circuit; and causing, by the at least one processing circuit, execution of the at least one function;

wherein determining the at least one function includes performing a fusion of the vehicle sensor data and the map data, wherein the fusion is performed based on at least one confidence value for at least one of the vehicle sensor data and the map data, wherein the at least one confidence value determines a relative impact of the vehicle sensor data and the map data in performing the fusion, and wherein the method includes ensuring a Safety of the Intended Functionality, SOTIF, wherein ensuring the SOTIF comprises:

performing, by the at least one processing circuit, a situation analysis to detect a situation that has a potential to impact safety of the vehicle, and adjusting, by the at least one processing circuit, the at least one confidence value based at least on the situation analysis, wherein ensuring the SOTIF further comprises performing, by the at least one processing circuit, a causality analysis that quantifies a degradation in confidence in the vehicle sensor data and/or the map data, wherein the at least one confidence value is adjusted based on both the situation analysis and the causality analysis.

* * * * *